United States Patent
Sakurai et al.

(10) Patent No.: US 9,633,470 B2
(45) Date of Patent: Apr. 25, 2017

(54) GENERATING SLICE DATA REPRESENTING A CROSS SECTION CUT FROM A THREE-DIMENSIONAL MODELED OBJECT

(71) Applicant: Roland DG Corporation, Hamamatsu (JP)

(72) Inventors: Takayuki Sakurai, Hamamatsu (JP); Yasutoshi Nakamura, Hamamatsu (JP)

(73) Assignee: Roland DG Corporation, Hamamatsu (JP)

( * ) Notice: Subject to any disclaimer, the term of this patent is extended or adjusted under 35 U.S.C. 154(b) by 118 days.

(21) Appl. No.: 14/578,279

(22) Filed: Dec. 19, 2014

(65) Prior Publication Data

US 2016/0133050 A1    May 12, 2016

(30) Foreign Application Priority Data

Nov. 11, 2014   (JP) .................................. 2014-229233

(51) Int. Cl.
| | |
|---|---|
| *G06T 15/06* | (2011.01) |
| *G06T 15/50* | (2011.01) |
| *G06T 17/20* | (2006.01) |
| *G06T 19/00* | (2011.01) |

(52) U.S. Cl.
CPC ............ *G06T 15/506* (2013.01); *G06T 17/20* (2013.01); *G06T 19/00* (2013.01); *G06T 2219/008* (2013.01)

(58) Field of Classification Search
None
See application file for complete search history.

(56) References Cited

U.S. PATENT DOCUMENTS

| 5,489,952 A | 2/1996 | Gove et al. |
|---|---|---|
| 5,601,084 A * | 2/1997 | Sheehan ................ B82Y 15/00 600/416 |
| 7,783,371 B2 | 8/2010 | John et al. |
| 8,048,359 B2 | 11/2011 | Wang et al. |
| 8,126,580 B2 | 2/2012 | El-Siblani et al. |
| 8,568,646 B2 | 10/2013 | Wang et al. |

(Continued)

FOREIGN PATENT DOCUMENTS

| EP | 1849587 | 10/2007 |
|---|---|---|
| JP | 04-152757 | 5/1992 |

(Continued)

*Primary Examiner* — Said Broome
(74) *Attorney, Agent, or Firm* — Klarquist Sparkman, LLP

(57) ABSTRACT

To make it possible to generate slice data without the need to modify a polygon mesh that does not satisfy conditions of a perfect solid model. A slice data generator for generating slice data representing a cross section cut from a three-dimensional modeled object, wherein the slice data generator has: changing means for changing topology information of a polygon mesh so that a contour polyline is obtained indicating a contour line of a cut cross section of the polygon mesh; and modifying means for acquiring the contour polyline from the polygon mesh, the topology information of the polygon mesh having been changed by the changing means, and modifying the contour polyline so that an inside which is a region inside the acquired contour polyline can be normally filled; slice data being generated on the basis of the contour polyline modified by the modifying means.

17 Claims, 18 Drawing Sheets

(56) References Cited

U.S. PATENT DOCUMENTS

2008/0094406 A1* 4/2008 Weese .................. G06T 1/60
                                                              345/544
2009/0136103 A1* 5/2009 Sonka ................ G06K 9/4638
                                                              382/128
2014/0278292 A1* 9/2014 Grellou .............. G06F 17/5018
                                                              703/2

FOREIGN PATENT DOCUMENTS

| JP | 06-246838   | 9/1994  |
|----|-------------|---------|
| JP | 07-170467   | 7/1995  |
| JP | 2002-506230 | 2/2002  |
| JP | 2003-503232 | 1/2003  |
| JP | 4049654     | 12/2007 |
| JP | 5406432     | 11/2013 |
| JP | 5379236     | 12/2013 |

* cited by examiner

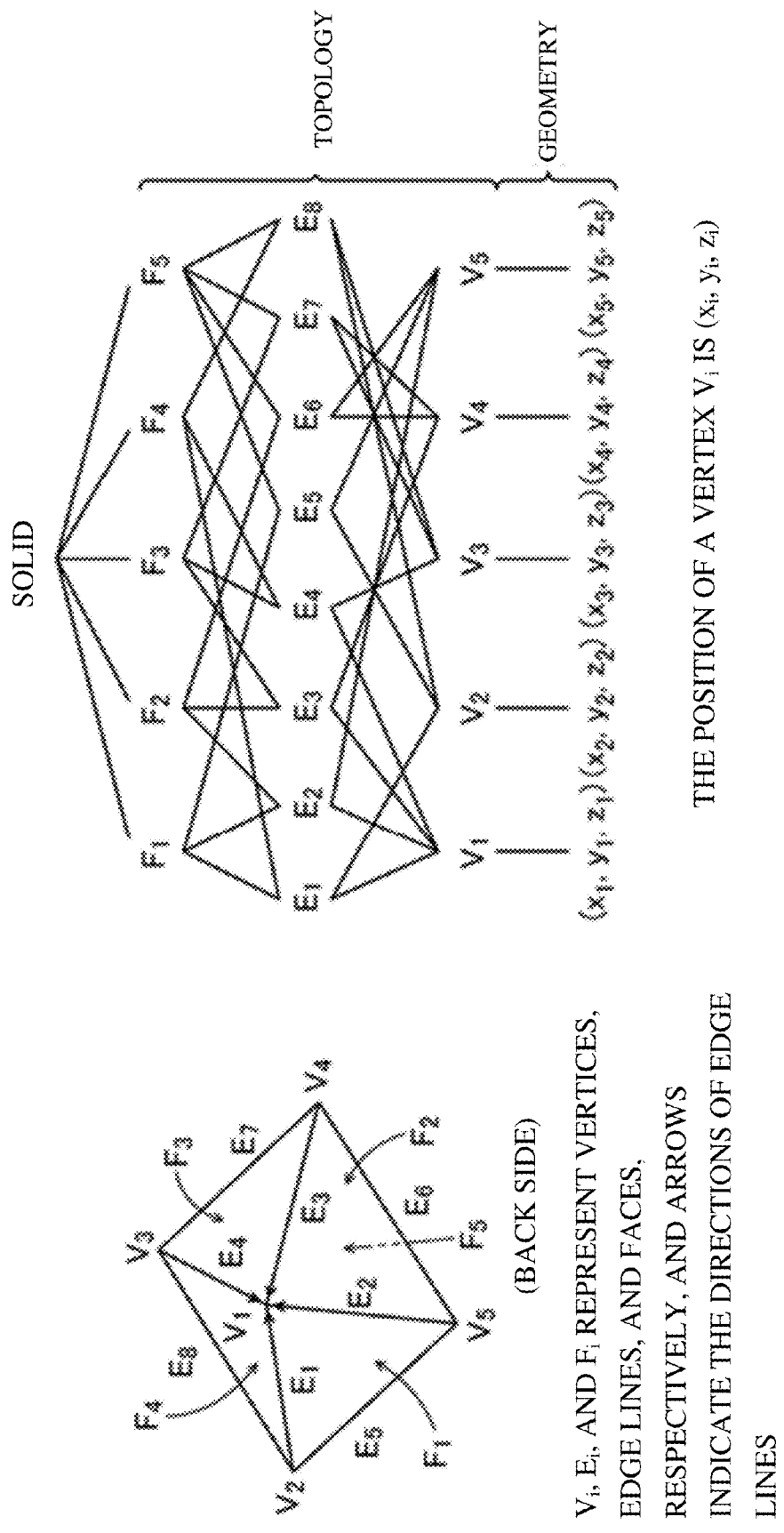
FIG. 4 POLYGON MESH BOUNDARY REPRESENTATION

NON-MANIFOLD MODIFICATION

TOP END POINTS OF BOTH EDGE LINES N THE Z
DIRECTION HAVE THE SAME COORDINATES

BOTTOM END POINTS OF BOTH EDGE LINES N THE Z
DIRECTION HAVE THE SAME COORDINATES

CONNECTION OF CUT LINE SEGMENTS OF POLYGON MESH

RESULT OF FILLING BY SCAN CONVERSION WHEN POLYLINES INTERSECT

1. ELIMINATION OF SELF-INTERSECTION

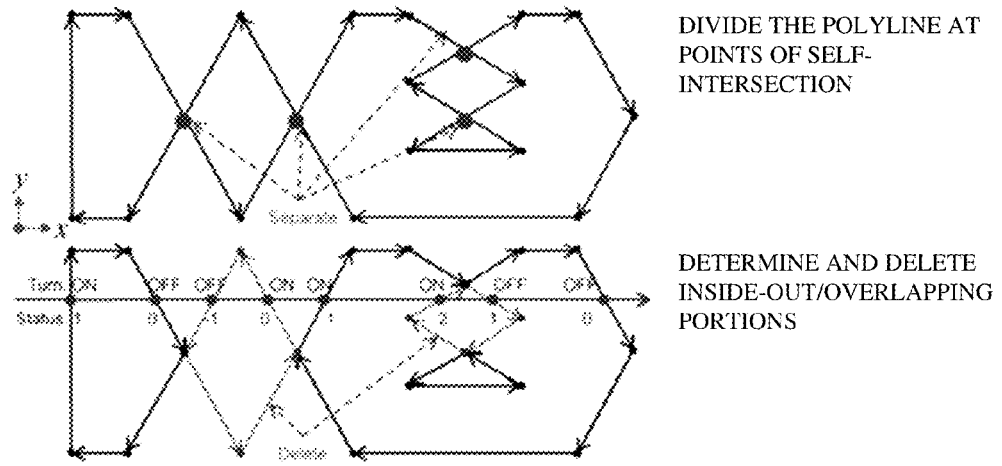

DIVIDE THE POLYLINE AT POINTS OF SELF-INTERSECTION

DETERMINE AND DELETE INSIDE-OUT/OVERLAPPING PORTIONS

FIG. 8A

2. ELIMINATION OF INTERSECTION WITH OTHER POLYLINES

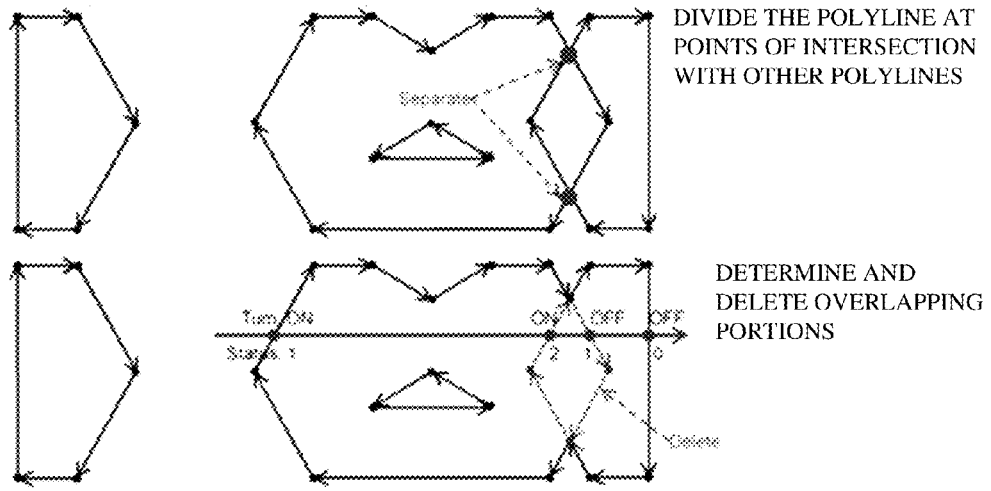

DIVIDE THE POLYLINE AT POINTS OF INTERSECTION WITH OTHER POLYLINES

DETERMINE AND DELETE OVERLAPPING PORTIONS

FIG. 8B

3. SYNTHESIS

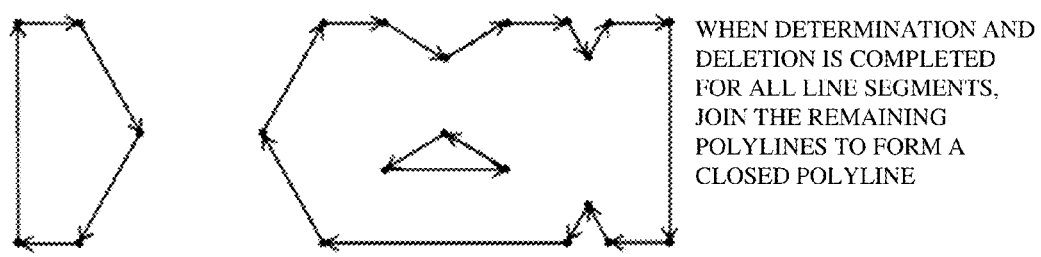

WHEN DETERMINATION AND DELETION IS COMPLETED FOR ALL LINE SEGMENTS, JOIN THE REMAINING POLYLINES TO FORM A CLOSED POLYLINE

FIG. 8C

POLYLINE SYNTHESIS

WORLD COORDINATE SYSTEM

IMAGE COORDINATE SYSTEM; FOR BITMAP

IMAGE COORDINATE SYSTEM; FOR VECTOR

WORLD COORDINATE SYSTEM AND IMAGE COORDINATE SYSTEM

REENTRANT POLYGON CLIPPING (PIPELINE CLIPPING)

POLYLINE FILLING BY SCAN CONVERSION

APPLICATION SOFTWARE STRUCTURE

PROCESSING IN THE CONTOUR EXTRACTION UNIT

LIGHT INTENSITY CORRECTION VALUE [%] = 100% - (LIGHT INTENSITY MEASUREMENT VALUE − SMALLEST LIGHT INTENSITY MEASUREMENT VALUE)

FLOW OF IMAGE PROCESSING

EXAMPLE OF LIGHT INTENSITY MEASUREMENT VALUES (LIGHT INTENSITY SETTING VALUES) TABLE

GENERATING SLICE DATA REPRESENTING A CROSS SECTION CUT FROM A THREE-DIMENSIONAL MODELED OBJECT

CROSS-REFERENCE TO RELATED APPLICATIONS

This application is based upon and claims priority under 35 U.S.C. §119 to Japanese Patent Application No. 2014-229233, filed Nov. 11, 2014, entitled "SLICE DATA CREATION DEVICE, SLICE DATA CREATION METHOD, PROGRAM, AND COMPUTER-READABLE RECORDING MEDIUM", the entire contents of which are hereby incorporated herein by reference.

FIELD

The disclosed technology relates to a slice data creation device, a slice data creation method, a program, and a computer-readable recording medium, and more specifically relates to a slice data creation device for creating slice data suitable for use in a three-dimensional modeling device or the like such as for fabricating a three-dimensional modeled object using a photocurable resin or the like cured by light irradiation, and to a slice data creation method, a program, and a computer-readable recording medium.

BACKGROUND

A three-dimensional modeling device is conventionally known which uses a photocurable resin having a substance cured by irradiation with visible light, ultraviolet light, or other light.

This three-dimensional modeling device is configured so as to fabricate a three-dimensional modeled object by a method such as the method described below, for example.

A photocurable resin stored in a storage tank is irradiated with light, whereby an amount of the photocurable resin commensurate with a predetermined liquid layer thickness is cured and a cured layer is formed on a surface of a base member immersed in the photocurable resin stored in the storage tank and which serves as a foundation for a three-dimensional modeled object.

An amount of the base member commensurate with the predetermined liquid layer thickness is moved, after which the photocurable resin is further irradiated with light, and a new cured layer is formed on the cured layer previously cured.

The operation of forming a new cured layer on the previous cured layer is sequentially repeated, and a three-dimensional modeled object is fabricated by layering cured layers.

The details of such a three-dimensional modeling device are disclosed, for example, in Japanese patent application laid-open publication No. H06-246838 (Patent Reference 1), the entire contents of which are hereby incorporated herein by reference.

In a three-dimensional modeling device configured as described above, when a cured layer is formed, laser light is radiated to the photocurable resin while a vector image is drawn, for example, and the photocurable resin is cured in a predetermined shape having a predetermined liquid layer thickness.

Specifically, the three-dimensional modeling device described above is configured so as to cure the photocurable resin and form a three-dimensional shape by projecting a two-dimensional image from a projector, or moving a laser light using an XY drive device, a galvano mirror, or the like for moving the laser light on a two-dimensional XY plane.

When forming one cured layer, the laser light first scans the photocurable resin along a contour of the cured layer on the basis of data representing the shape of the cured layer, for example, and the contour of the cured layer is formed. The laser light then scans the region inside the contour to cure the photocurable resin inside the region, and a cured layer having a predetermined shape is formed.

The data representing the shape of the cured layer described above are cross-sectional shape data representing cross sections cut at predetermined intervals from the three-dimensional modeled object to be fabricated, and in the present specification, the cross-sectional shape data representing cross-sections of the three-dimensional modeled object are referred to as "slice data."

The slice data described above are usually generated from a polygon mesh of the three-dimensional modeled object to be fabricated, the polygon mesh being data created by a three-dimensional computer-aided design (CAD) system.

All of the polygon mesh for generating the slice data is configured from triangular faces, and in order for slice data to be generated from the polygon mesh and modeling to be performed in the three-dimensional modeling device, the polygon mesh must satisfy the conditions of a perfect solid model.

Here, for the polygon mesh to "satisfy the conditions of a perfect solid model" means that all of the triangular faces constituting the polygon mesh are connected at sides thereof, and that two triangular faces are connected at each of all of the sides.

A polygon mesh actually employed in a three-dimensional modeling device may sometimes not satisfy the conditions of a perfect solid model described above.

In this case, before generating slice data, a worker must use commercially available modification software or the like to modify the polygon mesh that does not satisfy the conditions of a perfect solid model and create a polygon mesh that satisfies the conditions of a perfect solid model in advance.

However, it has been pointed out that even when a worker applies modification to the polygon mesh using modification software, the modification necessary for enabling slice data to be generated is not easy to perform, and the worker is forced to perform advanced modification.

It has also been pointed out that the commercially available modification software is extremely expensive, and the modification software itself is not easy to purchase.

SUMMARY

The various embodiments of the disclosed technology were developed in view of various problems of the prior art such as those described above, and a purpose thereof is to provide a slice data creation device, a slice data creation method, a program, and a computer-readable recording medium whereby slice data can be generated without advanced modification of a polygon mesh that does not satisfy the conditions of a perfect solid model.

In order to achieve the purpose described above, an aspect of the disclosed technology is configured so as to perform the following processes: (1) changing topology information ("topology information of a polygon mesh" being connection information of the triangular faces constituting the polygon mesh) of a polygon mesh so that a contour polyline (continuous line segment) is obtained which is a polyline indicating a contour line of a cut cross section of the polygon mesh; and (2) modifying the contour polyline obtained by process (1) so that an inside which is the region inside the contour polyline can be normally filled.

Here, process (1) is specifically for ensuring that two triangular faces are connected at each of all of the sides.

Process (2) is specifically for eliminating states in which the contour polyline improperly intersects.

In the various embodiments of the disclosed technology, it is thereby possible to generate slice data without performing advanced modification of a polygon mesh that does not satisfy the conditions of a perfect solid model.

Consequently, through the various embodiments of the disclosed technology, a worker is not unnecessarily forced to perform advanced modification of a polygon mesh, and there is also no need to purchase expensive modification software.

Specifically, the slice data creation device according to an aspect of the disclosed technology is a slice data generator for generating slice data representing a cross section cut from a three-dimensional modeled object, and has changing means for changing topology information of a polygon mesh so that a contour polyline is obtained indicating a contour line of a cut cross section of the polygon mesh, and modifying means for acquiring the contour polyline from the polygon mesh, the topology information of the polygon mesh having been changed by the changing means, and modifying the contour polyline so that an inside which is a region inside the acquired contour polyline can be normally filled, and the slice data creation device is configured so as to generate slice data on the basis of the contour polyline modified by the modifying means.

The slice data creation method according to an aspect of the disclosed technology is a slice data generation method for generating slice data representing a cross section cut from a three-dimensional modeled object, and comprises changing topology information of a polygon mesh so that a contour polyline is obtained indicating a contour line of a cut cross section of the polygon mesh, acquiring the contour polyline from the polygon mesh, the topology information of the polygon mesh having been changed by the changing means, and modifying the contour polyline so that an inside which is a region inside the acquired contour polyline can be normally filled, and the slice data creation method is configured so that slice data are generated on the basis of the modified contour polyline.

The program according to an aspect of the disclosed technology is a program for causing a computer to function as the slice data generator.

The program according to an aspect of the disclosed technology is a program for causing a computer to implement the slice data generation method.

The computer-readable recording medium according to an aspect of the disclosed technology is a computer-readable recording medium in which the program is stored.

The slice data generator according to an aspect of the disclosed technology is a slice data generator for generating slice data representing a cross section cut from a three-dimensional modeled object comprising: a changing unit for changing topology information of a polygon mesh so that a contour polyline is obtained indicating a contour line of a cut cross section of the polygon mesh; a modifying unit for acquiring the contour polyline from the polygon mesh, the topology information of the polygon mesh having been changed by said changing unit, and modifying said contour polyline so that an inside which is a region inside said acquired contour polyline can be normally filled; and a setting unit for setting a luminance value for each of a plurality of first pixels constituting the slice data on the basis of a positional relationship between said contour polyline modified by said modifying unit and each first pixel.

A three-dimensional modeling device according to an aspect of the disclosed technology comprising: an input unit for inputting slice data generated by a slice data generator; a plurality of reflectors, each of which is provided to correspond to corresponding one of a plurality of second pixels and supported so as to be able to rotate between a first position in which light emitted by said light source is reflected and directed to a photocurable material, and a second position in which light emitted by said light source is not directed to said photocurable material; a setting unit for setting a luminance value for each second pixel by interpolation using luminance values set for two or more corresponding first pixels from among said plurality of first pixels; and a control unit for controlling the rotation of each reflector of said plurality of reflectors on the basis of the luminance value set for the second pixel corresponding to the reflector.

Through the various embodiments of the disclosed technology configured as described above, superior effects are obtained whereby slice data can be generated without performing advanced modification of a polygon mesh that does not satisfy the conditions of a perfect solid model.

BRIEF DESCRIPTION OF THE DRAWINGS

FIG. 4 is a view illustrating the boundary representation of the polygon mesh.

FIGS. 8A, 8B, and 8C are views illustrating the process of polyline synthesis.

DETAILED DESCRIPTION

Examples of the slice data creation device, slice data creation method, program, and computer-readable recording medium according to various embodiments of the disclosed technology are described below in detail with reference to the accompanying drawings.

Figure 1:
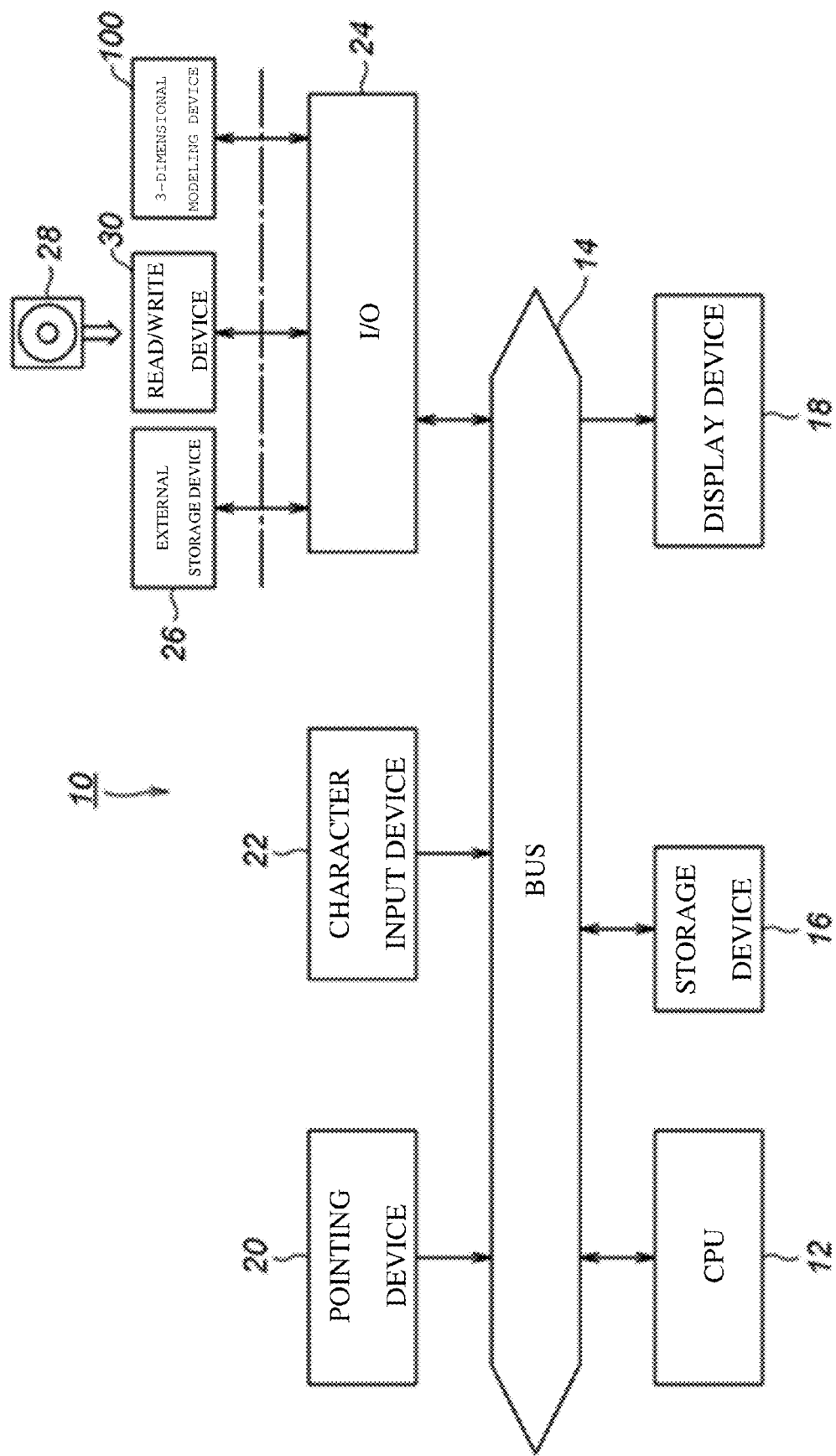
FIG. 1 is a block configuration view illustrating the hardware configuration of the slice data creation device according to an example of an embodiment of the disclosed technology.

FIG. 1 is a block configuration view illustrating the hardware configuration of the slice data creation device according to an example of an embodiment of the disclosed technology.

Specifically, a slice data creation device 10 according to an embodiment of the disclosed technology is realized by a publicly known personal computer, a general-purpose computer, or the like, and is configured so that the operation thereof is controlled using a central processing device (CPU) 12.

A storage device 16 configured from a read-only memory (ROM) for storing a program, various kinds of data, and the like for controlling the CPU 12, a random-access memory (RAM) provided with a storage region or the like used as a working area for the CPU 12, or the like, and a display device 18 provided with a CRT, liquid crystal panel, or other screen for performing various kinds of display on the basis of control by the CPU 12, a mouse or other pointing device 20 as an input device for specifying an arbitrary position on the display screen of the display device 18, a keyboard or other character input device 22 as an input device for inputting arbitrary characters, and an input/output interface circuit (I/O) 24 for various kinds of externally connected instruments are connected to the CPU 12 via a bus 14.

A hard disk or other external storage device 26 is also connected via the I/O 24 in this slice data creation device 10.

In the slice data creation device 10, a read/write device 30 for writing and storing various kinds of data created on the basis of control by the CPU 12 in a computer-readable recording medium (referred to simply as "recording medium" below) such as a compact disc (DC) or a digital versatile disc (DVD) and writing various kinds of data stored in the storage medium 28 to the storage device 16 is furthermore connected via the I/O 24.

In the slice data creation device 10, a three-dimensional modeling device 100 for fabricating a three-dimensional modeled object using slice data created by the slice data creation device 10 is furthermore connected via the I/O 24.

A publicly known conventional three-dimensional modeling device can be used as the three-dimensional modeling device 100, and a detailed description thereof therefore will not be given.

In order to facilitate understanding of the slice data creation device 10 in the following description, it is assumed that a program for executing processing for creation of slice data by the slice data creation device 10, or various kinds of data used in processing for creating the slice data are stored in advance in the storage device 16.

The program for executing processing for creation of slice data by the slice data creation device 10, or the various kinds of data used in processing for creating the slice data may also be read to the random-access memory of the storage device 16 of the slice data creation device 10 from outside by communication.

The slice data creation device 10 for three-dimensional modeling according to an example of an embodiment of the disclosed technology will next be described in detail with reference to FIG. 2.

Figure 2:
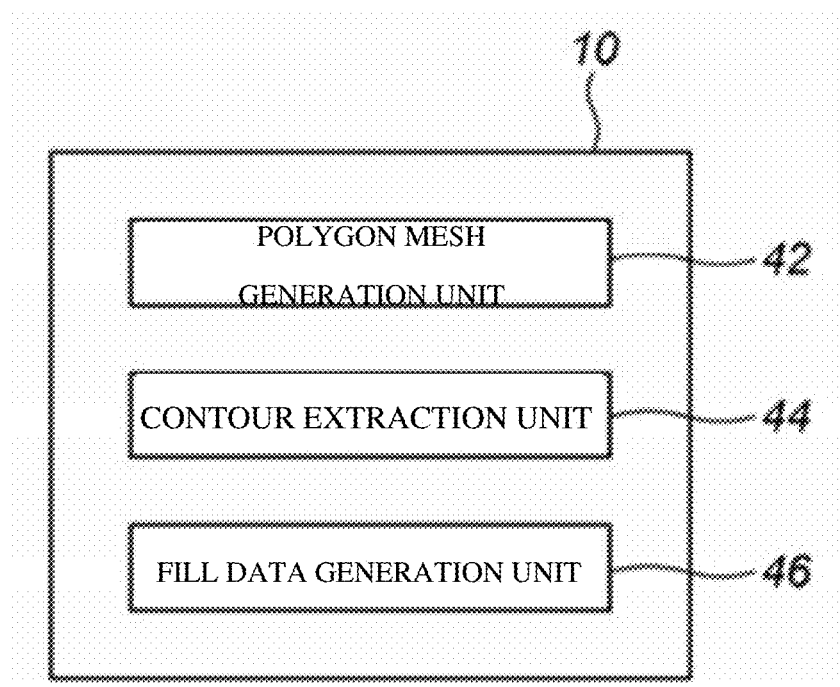
FIG. 2 is a block configuration view illustrating the functional configuration of the slice data creation device according to an example of an embodiment of the disclosed technology.

FIG. 2 is a block configuration view illustrating the functional configuration of the slice data creation device 10 according to an example of an embodiment of the disclosed technology.

The slice data creation device 10 reads polygon mesh data from a stereolithography (STL) file, and generates slice data used in optical modeling by the three-dimensional modeling device 100.

Raster schemes and vector schemes are commonly known as methods of optical modeling in a three-dimensional modeling device.

Here, a projector device for projecting a two-dimensional image is used in a raster scheme, and a device for scanning a laser pointer in X and Y directions or a device for scanning laser light at high speed through use of a galvano mirror is used in a vector scheme.

The slice data generated by the slice data creation device 10 can be used in three-dimensional optical modeling by a three-dimensional modeling device employing either of the abovementioned schemes.

Specifically, in the slice data creation device 10, processing is performed for obtaining a plurality of contour shapes obtained by cutting a three-dimensional model, which is a three-dimensional modeled object that is to be fabricated, into cross sections at fine intervals from the bottom end to the top end thereof, and then obtaining bitmap images in which the insides of the contour shapes are filled.

Figure 3:
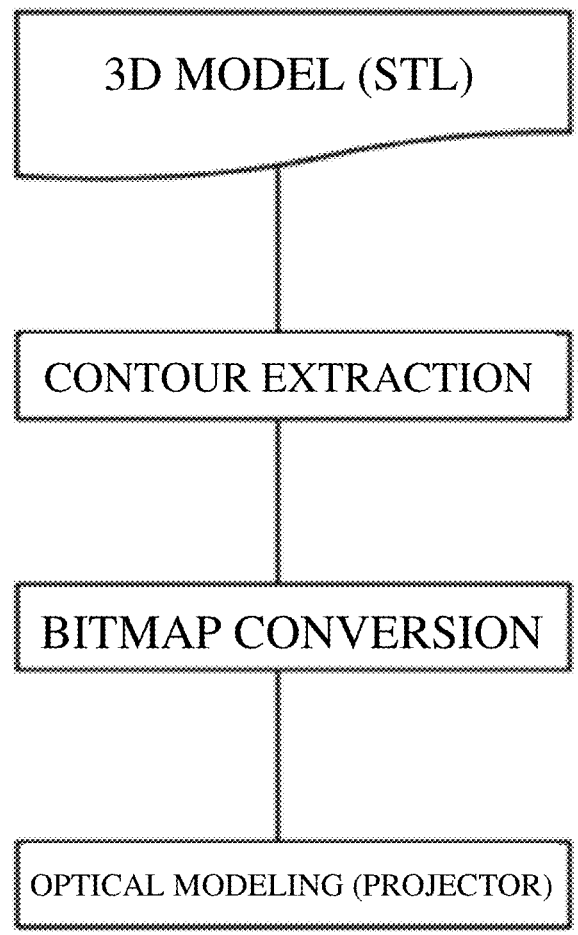
FIG. 3 is a view conceptually illustrating the flow of processing from generation of slice data to optical modeling according to an embodiment of the disclosed technology.

FIG. 3 is a view conceptually illustrating the flow of processing described above from generation of slice data to optical modeling.

The slice data creation device 10 is configured having a polygon mesh generation unit 42 for reading a polygon mesh from an STL file used in rapid prototyping and generating a polygon mesh subjected to non-manifold modification according to an embodiment of the disclosed technology or other processing, a contour extraction unit 44 for slicing the polygon mesh generated by the polygon mesh generation unit 42 and acquiring a contour shape, and a fill data generation unit 46 for filling the inside of the contour shape extracted by the contour extraction unit 44 with a bitmap, and the data generated by the fill data generation unit 46 is ultimately outputted to the three-dimensional modeling device 100 as the slice data used in optical modeling by the three-dimensional modeling device 100.

The processing performed in the polygon mesh generation unit 42, the contour extraction unit 44, and the fill data generation unit 46 is described in detail below.

(1) Processing in the Polygon Mesh Generation Unit 42

Figure 13:
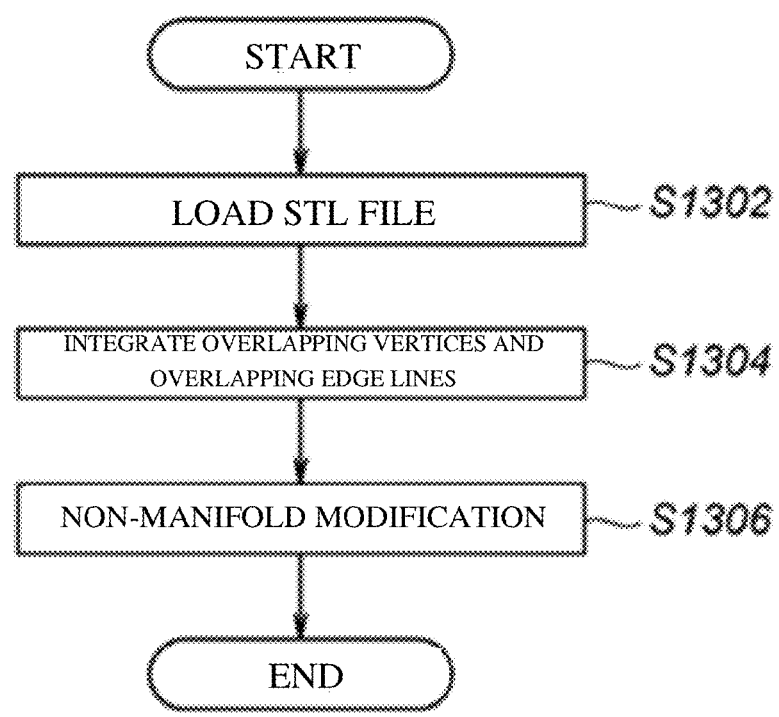
FIG. 13 is a flowchart illustrating the processing performed in the polygon mesh generation unit.

In the polygon mesh generation unit 42, polygon mesh information is read from the STL file and adjustment necessary for generating slice data for the read polygon mesh is performed. The technical particulars of this process are described in detail below with reference to FIG. 13.

In order to facilitate understanding in the description below, boundary representation in the polygon mesh will first be described as the internal representation method necessary for generating slice data.

Specifically, in the slice data creation device 10, polygon mesh information is managed by the publicly known boundary representation illustrated in FIG. 4.

A vertex ($V_i$) has a three-dimensional coordinate value (geometry), and an edge line ($E_i$) has information (topology) of vertices of both ends thereof.

A face ($F_i$) has information (topology) of three edge lines surrounding the face. The sequence of the edge line data of a face is clockwise about the forward direction of a normal vector to the face.

(1-1) Step S1302: Loading (Reading) of the STL File

In the polygon mesh generation unit 42, an STL file is first loaded and polygon mesh information is read.

Here, the STL file format specification is a publicly known feature and therefore will not be described in detail. In accordance with the STL file format specification, vertex and face data are created and data of the three edge lines constituting each face are also created so as to give the polygon mesh boundary representation described above.

The processing for creating the vertex, face, and edge line data described above is a publicly known technique, and therefore will not be described in detail.

(1-2) Step S1304: Integration of Overlapping Vertices and Overlapping Edge Lines In the state of the data created in (1-1), i.e., step S1302, vertices having the same coordinate values as those of an adjacent face overlap, and processing is therefore performed for integrating the overlapping vertices into single vertices. The vertex information of each edge line is updated in conjunction with this processing. As a result, the boundary edge lines of adjacent faces also have the same vertex configuration and overlap, and are therefore also integrated, and the topology information between faces and edge lines is also updated.

The processing for integrating the overlapping vertices and overlapping edge lines described above is a publicly known technique, and therefore will not be described in detail.

(1-3) Step S1306: Non-Manifold Modification

A polygon mesh handled in a solid model is a two-manifold, and there are always two triangular faces connected to one edge line, but in rare cases such as when the coordinate values of vertices are extremely close, four or more triangular faces may be connected to a single edge line.

Such a solid is referred to as a non-manifold, and a state such as described above can occur when the processing of (1-2) described above, i.e., the processing of step S1304 for integrating overlapping vertices and overlapping edge lines is merely performed.

Figure 5A:
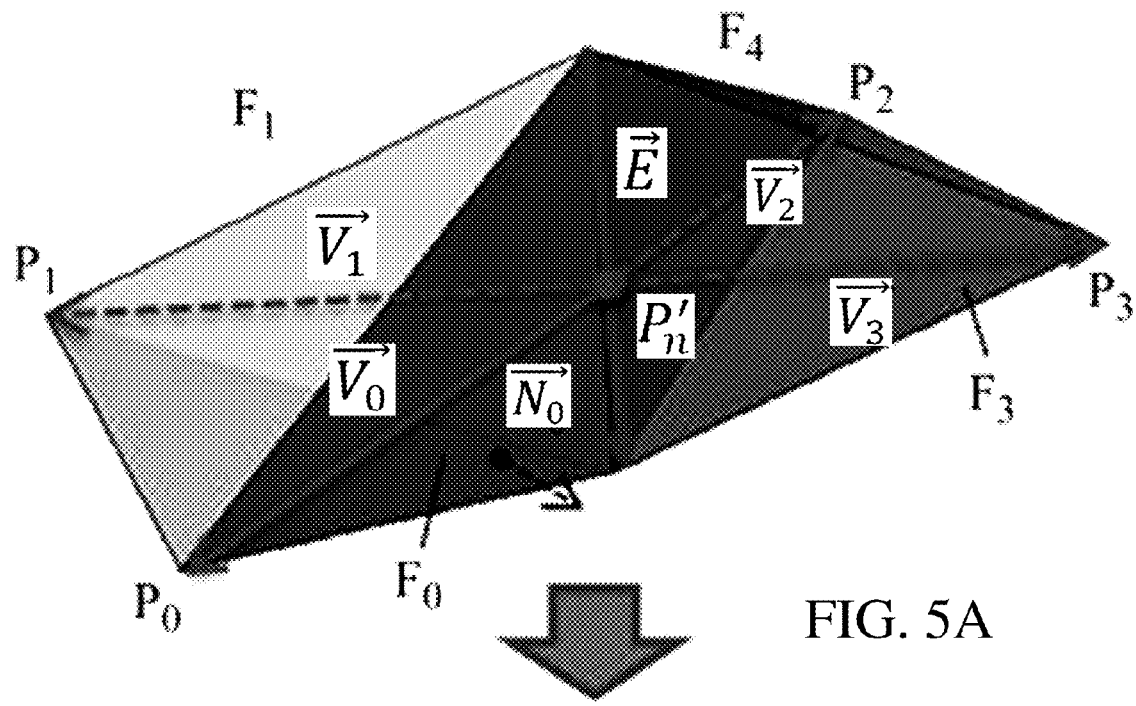
FIGS. 5A and 5B are views illustrating the process of non-manifold modification.

FIG. 5A illustrates an example in which two tetrahedrons are in close proximity, and edge lines that were originally separate are overlapping as a single edge line.

In this case, in the processing of the contour extraction unit 44, the acquisition of a contour polyline described hereinafter cannot be performed normally.

The reason for this is that when the intersection points of edge lines and a slice plane are joined in accordance with the connection information of a face, the connection progress direction diverges into a plurality of directions at the edge line, and the polyline acquisition result becomes undefined. In other words, the processing sometimes ends without all of the intersections being traced.

Figure 5B:
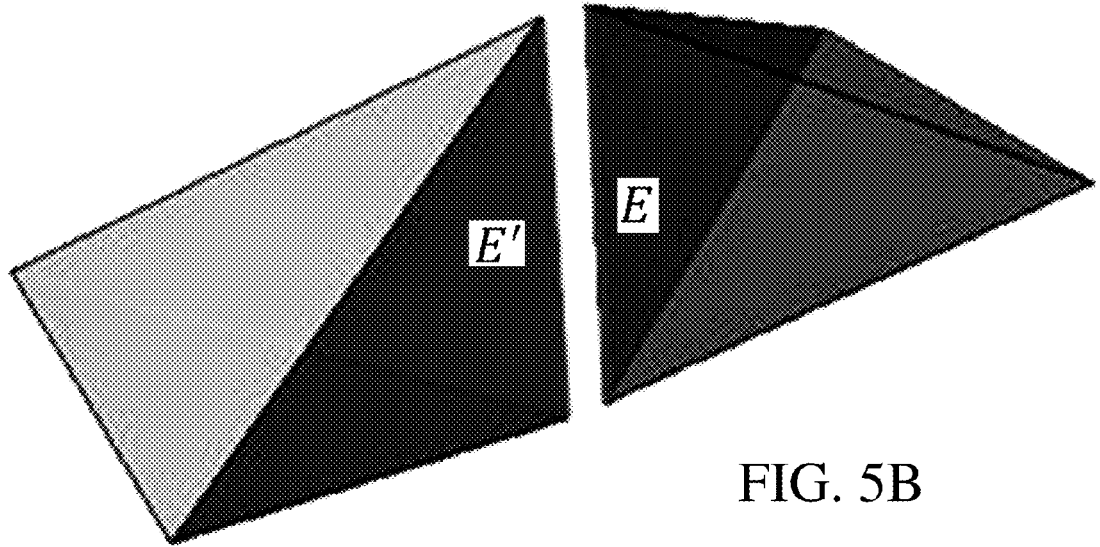

Therefore, as illustrated in FIG. 5B, when there is an edge line E at which four or more faces are connected, a duplicate E' thereof is created, and the topology information is changed so that two faces are connected to each edge line.

To select a pair of two faces, one face connected to an edge line is selected, and the face closest to the selected face on the back side thereof is then used as the other face of the pair.

By this method, in the example illustrated in FIGS. 5A and 5B, for example, the faces originally constituting a single triangular prism are selected, and the topology information connected with the faces is reconstructed.

The method for selecting faces of the closest pair on the back side is as described below. The variable "n" is "one less than the number of faces" connected to an edge line. Consequently, "n=3" in the example illustrated in FIGS. 5A and 5B.

(I) For the faces $F_0$ through $F_n$ connected to an edge line, the vertices P0 through Pn not belonging to the edge line are selected.

(II) Feet $P'_0$ through $P'_n$ of perpendicular lines dropped to the edge line from the vertices $P_0$ through $P_n$ are calculated.

(III) The cross product $$\vec{E}$$

of the unit vector $$\vec{V_0}$$

of $$\overrightarrow{P_0'P_0}$$

and the oppositely directed vector of the normal line $$\vec{N_0}$$

to the face is calculated.

$$\vec{E} = \vec{V_0} \times \vec{N_0}$$

(IV) From among $$\vec{V_i} = \overrightarrow{P_i'P_i} \quad (i=1\sim n)$$

the vector at the closest angle clockwise about $$\vec{E} \text{ from } \vec{V_0} \text{ is selected.}$$

Here, the angle can be evaluated by the size of the numerical value calculated from the equation below.

$$angle_i = \begin{cases} 1 - dot_i, & \text{if } \vec{V_0} \times \vec{V_i} = \vec{E} \\ 3 + dot_i, & \text{otherewise} \end{cases}$$

In the formula, $dot_i$ is the dot product of $$\vec{V_0} \text{ and } \vec{V_i}.$$

When the cross product of $\vec{V_0}$ and $\vec{V_i}$ is in the same direction as $\vec{E}$, $1+dot_i$ is calculated, otherwise $3+dot_i$ is calculated.

The value thus obtained is in the range of zero to less than four, and indicates the magnitude of an angle proportional to an angle of 0 degrees to less than 360 degrees from $$\vec{V_0} \text{ to } \vec{V_i},$$

a positive angle being clockwise about $\vec{E}$.

For example, in the example illustrated in FIG. 5, $\vec{V_1}$ is selected as the nearest vector, and as a result, the face $F_1$ is selected as being paired with the face $F_0$. The topology information for the two selected faces transfers to the duplicate E' of the edge line E.

The edge lines in FIG. 5B are drawn separated in order to depict an image in which the edge lines are cut apart, but the coordinates of the vertices of the edge lines do not actually move. Specifically, the edge line element is duplicated while the vertex elements thereof remain shared.

When there are six or eight connected faces, the edge line separation operation described above is repeated until the number of connected faces that remain is two.

As a result of the above process, only an edge line is duplicated while the vertex elements remain the same, but such topology information is not considered to be correct for a solid model.

However, since the purpose here is to compute the intersections of slice faces and edge lines and obtain connection information thereof, the abovementioned information will be used.

(2) Processing in the Contour Extraction Unit 44

In the contour extraction unit 44, processing is performed for cutting the polygon mesh generated according to the boundary representation by the polygon mesh generation unit 42 in a Z coordinate plane and obtaining the resultant contour shape (contour polyline).

In the contour extraction unit 44, processing is then performed for deleting intersecting portions and the like in order to enable the inside of the polyline to be appropriately filled, and lastly mapping onto an output data coordinate system.

Figure 14:
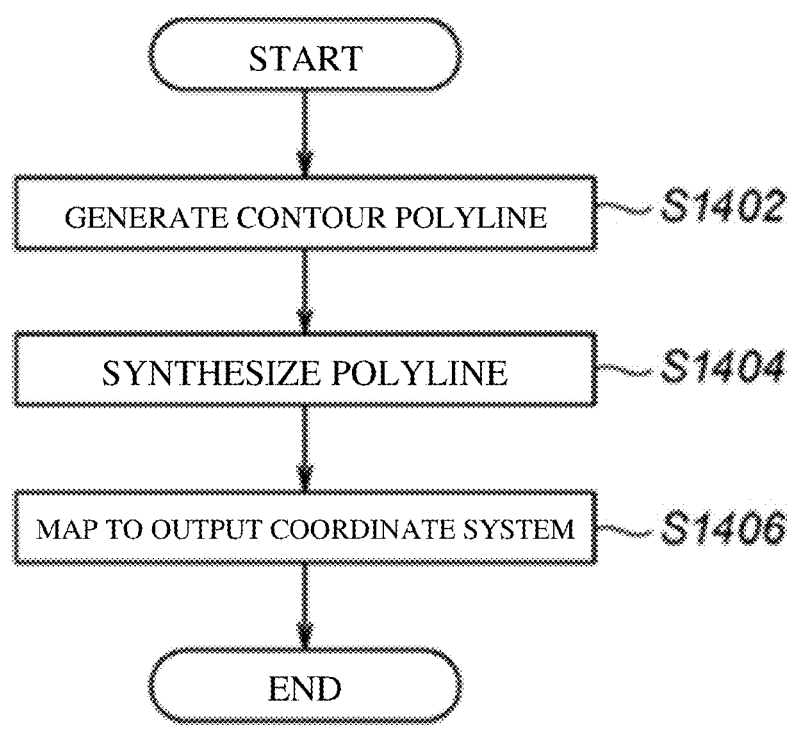
FIG. 14 is a flowchart illustrating the processing performed in the contour extraction unit.

The technical particulars of this processing are described hereinafter with reference to the flowchart illustrated in FIG. 14.

(2-1) Step S1402: Contour Polyline Generation (2-1-1) Intersection Points of Edge Lines and a Plane The coordinates of the intersection points of the edge lines of the polygon mesh with the slice face (plane having a normal vector parallel to the Z axis) are obtained. The results are correlated with each edge line and retained.

(2-1-2) Joining the Intersection Points to Generate a Contour Polyline

The direction of progress of the contour polyline is clockwise as viewed in the Z-axis direction looking downward from above the polygon mesh. Focusing interest on an edge line with which intersection coordinates are correlated, when intersection coordinates are also correlated with the other edge line of the face to which the edge line of interest is connected, a single cutting line segment is obtained joining the two intersection points. The direction in which to join the intersection points at this time is decided as described below.

Figure 6A:
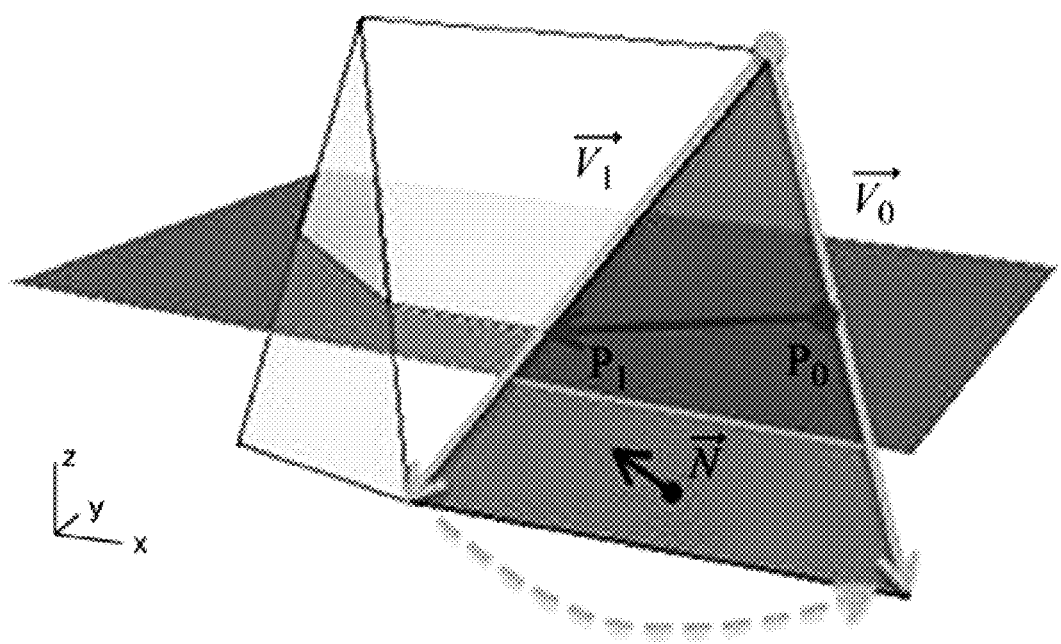
FIGS. 6A and 6B are views illustrating the method for connecting cut line segments of the polygon mesh.

Case in which the top ends of both edge lines in the Z direction have the same coordinates (see FIG. 6A)

The start point and end point are selected so that the direction of rotation from the downward vector of the edge line on the end-point side $\vec{V_1}$ to the downward vector of the edge line on the start-point side $\vec{V_0}$ has the same orientation as the normal vector $\vec{N}$ to the face.

Figure 6B:
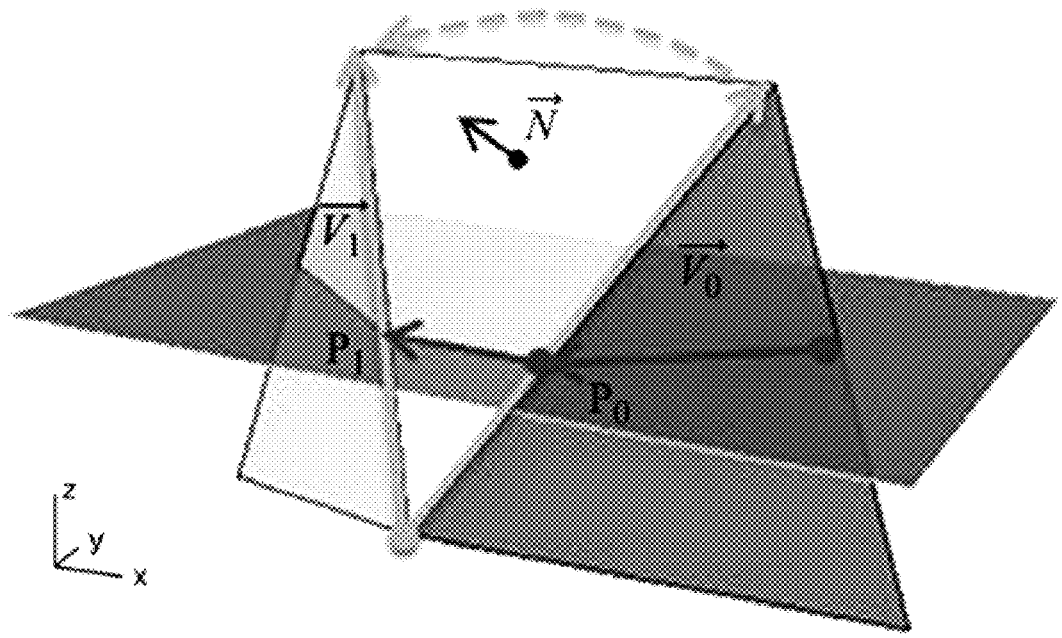

Case in which the bottom ends of both edge lines in the Z direction have the same coordinates (see FIG. 6B)

The start point and end point are selected so that the direction of rotation from the upward vector of the edge line on the start-point side $\vec{V_0}$ to the upward vector of the edge line on the end-point side $\vec{V_1}$ has the same orientation as the normal vector $\vec{N}$ to the face.

These processes are repeated until the process returns to the intersection at which tracking was started.

(2-2) Step S1404: Polyline Synthesis

Preparation is then performed for filling in the polyline of the section obtained by the processing described above.

Here, a polygon mesh of a solid model used in rapid prototyping ideally has no inconsistencies in the topology information thereof.

The contour obtained when such a model is cut by a plane is a single polyline that is completely closed and has no intersections, and filling of the inside thereof can easily be accomplished by a publicly known scan conversion or the like.

However, in some parts of STL data actually employed in CAD systems and the like, fine polygons are densely crowded and coordinate values are extremely close to each other, and polylines sometimes self-intersect.

There are also frequent cases in which a plurality of shapes is arranged infiltrating each other, and in such cases, a plurality of polylines intersects.

Figure 7:
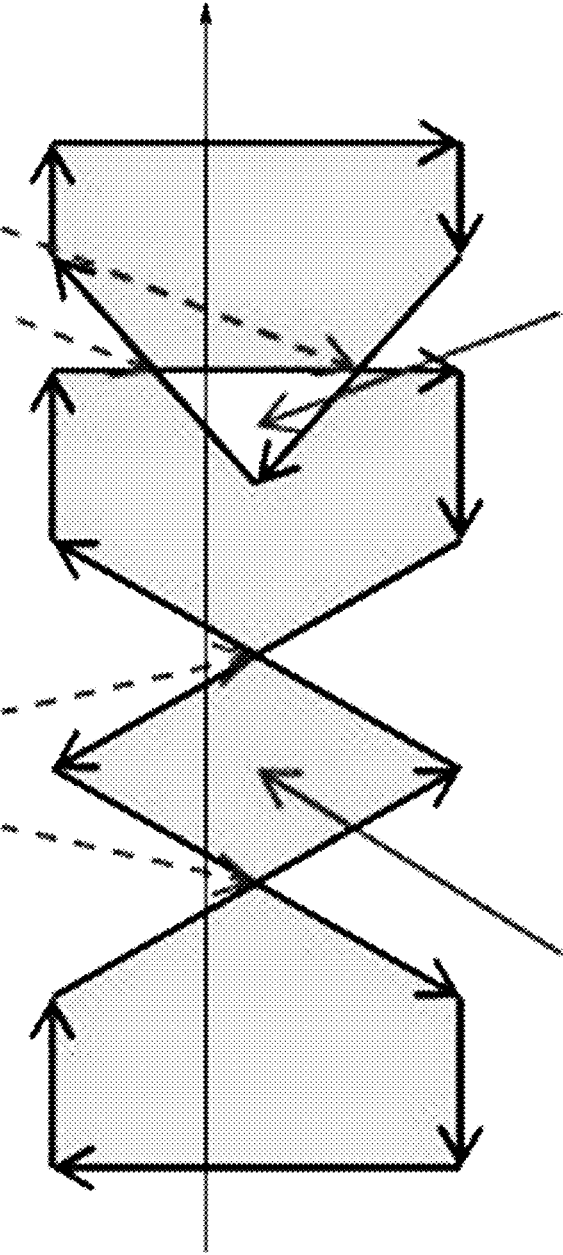
FIG. 7 is a view illustrating the effect of filling by scan conversion when a polyline intersects.

When filling is performed merely by scan conversion in such a condition, the inside/outside condition of the polyline is determined in sequence each time a line segment is intersected, and the inside of the original model therefore cannot be filled (see FIG. 7).

Therefore, by "(2-2) polyline synthesis" according to an embodiment of the disclosed technology, i.e., by the processing of step S1404, the polyline is divided into other polylines at such intersection points, line segments remaining inside are deleted, and the polylines are synthesized into a polyline which traces only the outer contour of the model.

(2-2-1) Elimination of Self-Intersection (See FIG. 8A)

First, the division synthesis processing described below is performed for a single polyline. When there is a plurality of polylines, the division synthesis processing is performed for each of the polylines.

(I) Division of Polylines at Self-Intersection Points

Each polyline is divided (separated) into a plurality of polylines at self-intersection points, which are the points at which the polyline intersects. The divided polylines have open ends.

(II) Determination and Deletion of Inside-Out/Overlapping Portions

Focusing on a single line segment of the polyline, the processing described below is repeated.

(i) A scan line is drawn in the X or Y direction through the coordinates of the midpoint of the line segment, and the coordinates of the intersection points for all line segments that intersect with the line segment are calculated.

(ii) The intersection points on the scan line are sorted in ascending order.

(iii) An inside/outside determination value at each intersection point is set. The cross product of the direction vector of the scan line and the direction vector of the line segment that includes the intersection point is calculated. When the Z component thereof is positive (directed from back to front with respect to the paper surface in FIG. 8), "ON" is set, and when the Z component is negative (directed from front to back with respect to the paper surface in FIG. 8), "OFF" is set.

(iv) A fill status is set from the small end of the intersection point coordinate values. A value of "0" is used as the initial status value. A "1" is added when the inside/outside determination value of the intersection point is "ON," and a "1" is subtracted when the inside/outside determination value is "OFF."

(v) When the inside/outside determination of an intersection point belonging to a line segment of interest is "OFF" and the status value is "−1 or less," or when the inside/outside determination is "ON" and the status value is "0 or less," the polyline to which the line segment belongs is inside-out and is not a contour line surrounding the original model, and is therefore deleted.

When the inside/outside determination is "OFF" and the status value is "1 or greater," or when the inside/outside determination is "ON" and the status value is "2 or greater," the polyline to which the line segment belongs is an overlapping part, and is therefore deleted.

To summarize these processes, polylines that are to be ultimately deleted can be determined as described below.

Deleted polylines are polylines other than those for which the inside/outside determination=OFF and status=0, or other than those for which the inside/outside determination=ON and status=1.

(2-2-2) Elimination of Intersections with Other Polylines (See FIG. 8B)

After self-intersection has been eliminated for each closed polyline, intersections with other polylines are eliminated.

In this case, inside-out portions such as in the case of self-intersection do not occur, but it is possible for overlapping portions to occur.

Overlapping portions can also be determined using scan lines, the same as in the case of self-intersection.

(2-2-3) Synthesis (See FIG. 8C)

In the case that determination and deletion processing has been completed for all line segments, remaining open polylines are joined to form a closed polyline.

(2-3) Step S1406: Mapping onto an Output Coordinate System

Application is then made to an image coordinate system for bitmap output, for outputting the contour polyline synthesized by the processing of (2-2-3) described above.

(2-3-1) Conversion of World Coordinate Values to Values in the Output Image Coordinate System Image coordinate values (u, v) are calculated by the formula below, where $(X_w, Y_w)$ are world coordinate values, $(s_x, s_y)$ are world→image coordinate scaling coefficients, and $(t_x, t_y)$ are translation amounts for the image coordinate origin.

$$\begin{bmatrix} u \\ v \\ 1 \end{bmatrix} = H \begin{bmatrix} X_w \\ Y_w \\ 1 \end{bmatrix}, H = \begin{bmatrix} s_t & 0 & t_x \\ 0 & s_y & t_y \\ 0 & 0 & 1 \end{bmatrix} \quad (1)$$

Figure 9A:
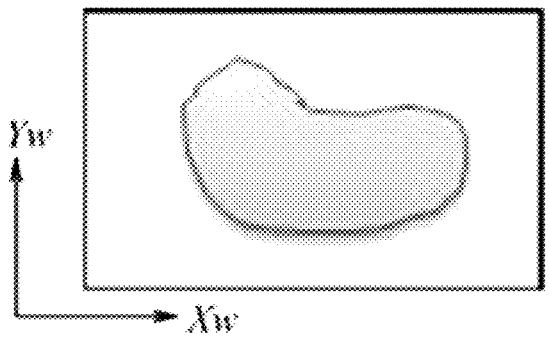
FIGS. 9A, 9B, and 9C are views illustrating the relationship between the world coordinate system and the image coordinate system.
Figure 9B:
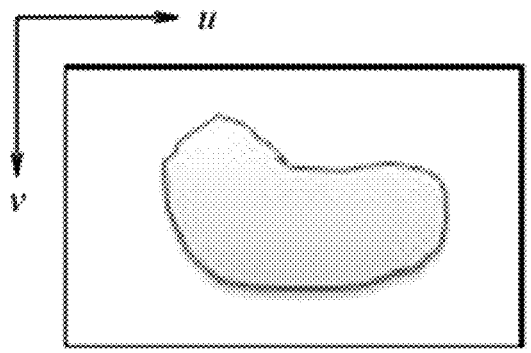
Figure 9C:
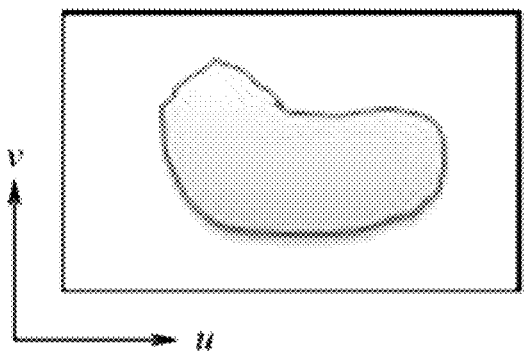

As illustrated in FIGS. 9B and 9C, there are two types of image coordinate systems: a bitmap image coordinate system and a vector image coordinate system (FIG. 9A illustrates a world coordinate system). A transformation matrix H is calculated in advance for each.

Here, the parameters of the transformation matrix H are as indicated below, where W, H [mm] are the width and height, respectively, of the world coordinate system, and $w_{bmp}$, $h_{bmp}$ are the width and height, respectively, of the bitmap image coordinate system.

$$\begin{cases} s_y = w_{bmp}/W \\ s_y = -h_{bmp}/H \end{cases} \begin{cases} t_x = 0 \\ t_y = h_{bmp} \end{cases}$$

The image size of the projector are used for $w_{bmp}$, $h_{bmp}$.

(2-3-2) Lens Distortion Correction of Coordinate Values

When a projector is used for modeling, image coordinates are converted using a researched distortion coefficient. Corresponding world coordinate values are calculated from the image coordinates.

The relationship between the original image coordinates (u, v) and the image coordinates $(u_d, v_d)$ after distortion in the radiating direction of the lens is represented by the equation below.

$$\begin{cases} u_d = u + (u - u_0)(1 + k_1 r^2 + k_2 r^4) \\ v_d = v + (v - v_0)(1 + k_1 r^2 + k_2 r^4) \end{cases} \quad (2)$$

Here, $(u_0, v_0)$ are the center coordinates of radial distortion, $r^2 = x^2 + y^2$, x, and y are normalized image coordinate values, and $k_1$, $k_2$ are coefficients of radial distortion which are to be calculated in advance.

In an embodiment of the disclosed technology, an object is to cause the coordinates after projection to have the original values by inversely correcting the coordinate values distorted by the lens. The inverse transformation of equation (2) above is therefore performed. A solution to a cubic equation by Newton's method is used in this inverse transformation.

(2-3-3) Clipping by the Image Coordinate System Range

Figure 10:
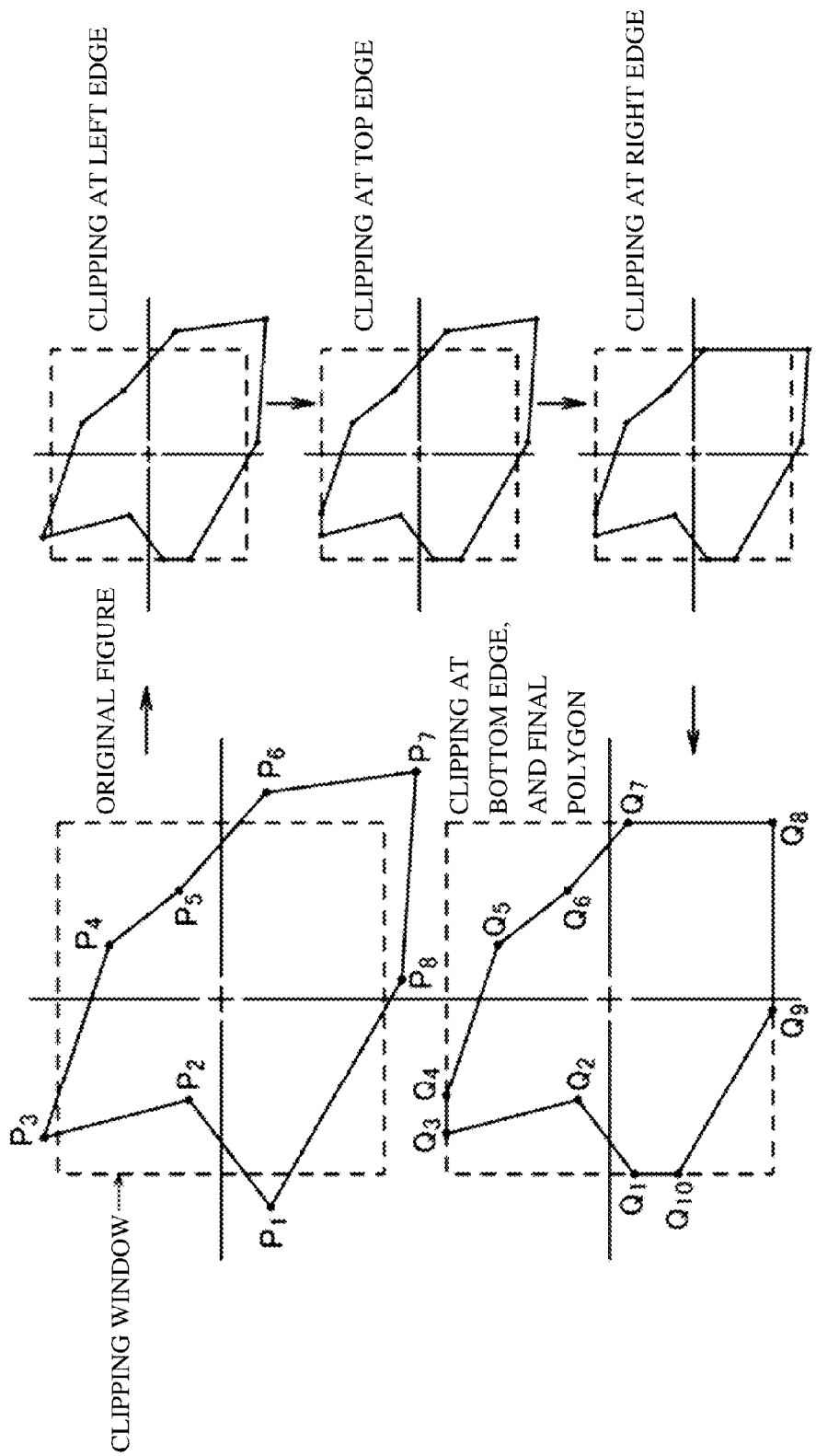
FIG. 10 is a view illustrating a process of reentrant polygon clipping (pipeline clipping).

When the entire region of the contour polyline of the three-dimensional model is not accommodated by the output image coordinate system, the region of the contour polyline is clipped by the boundary lines of the output image coordinate system. FIG. 10 is a view illustrating a publicly known process of reentrant polygon clipping (pipeline clipping). As illustrated in FIG. 10, the polyline is sequentially clipped by the top side, the bottom side, the left side, and the right side, of the image coordinate range. The order of the sides does not matter, however.

(3) Processing in the Fill Data Generation Unit 46 (Luminance Setting Unit 46)

In the fill data generation unit 46 (luminance setting unit 46), bitmap data are generated for filling the inside of the contour polyline obtained by the processing described above.

Specifically, bitmap data for filling the inside of the region surrounded by the contour polyline by a publicly known process based on scan conversion are generated. The technical particulars of this generating process are described in detail below.

(3-1) Pixel Database Creation

Figure 11:
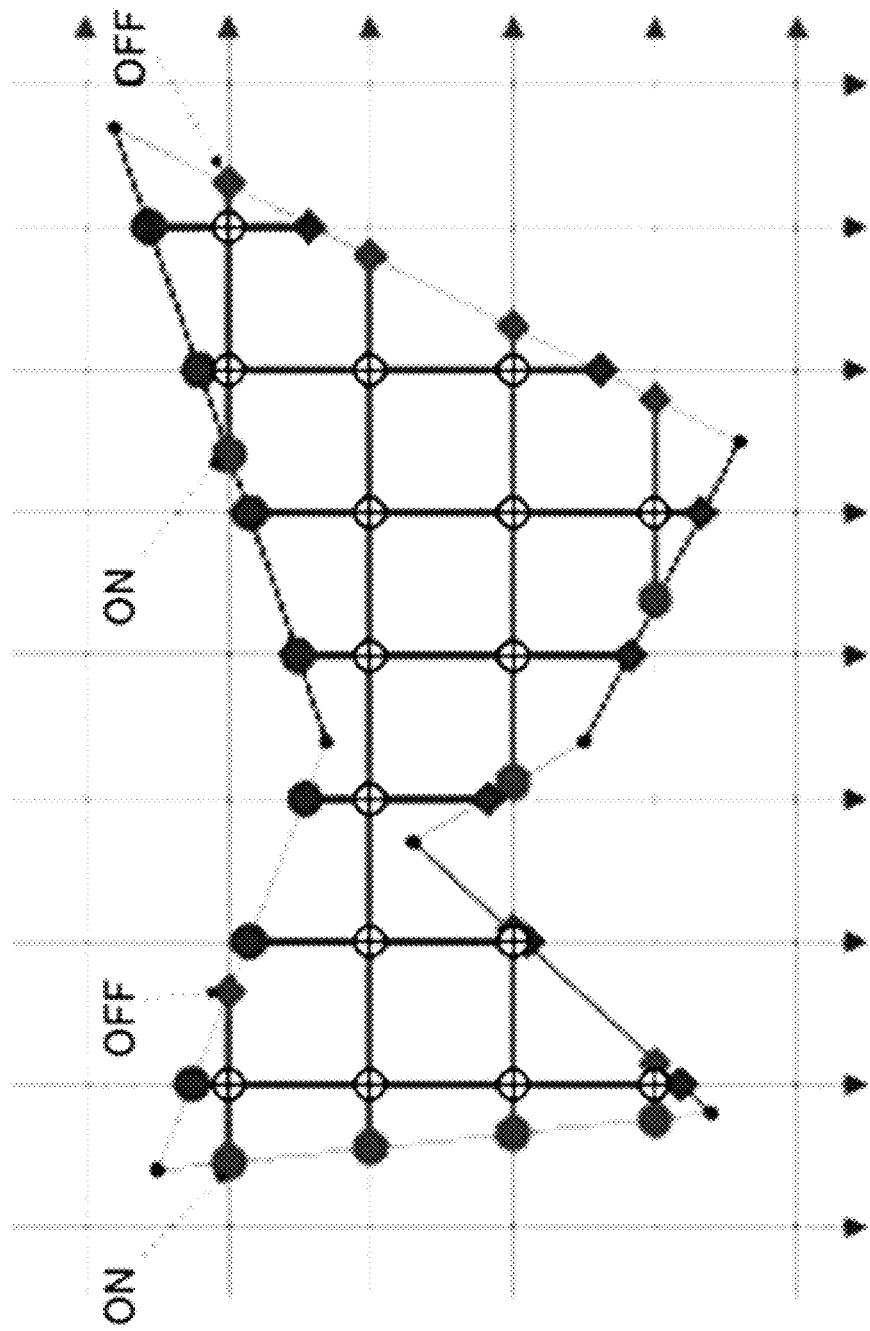
FIG. 11 is a view illustrating the processing for filling a polyline by scan conversion.

FIG. 11 is a view illustrating the processing for filling a polyline by scan conversion. In FIG. 11, each square cell represents a single pixel of the bitmap image.

Data are set indicating whether or not corners of the pixels are inside the region surrounded by the polyline.

The intersection coordinates with the polyline are calculated and set at the edges of the pixels. Transverse/longitudinal scan lines along pixel edges are traced from small coordinate values to large coordinate values, and a status of "ON" or "OFF" is alternately set each time that intersection coordinates are passed through.

Corners of pixels between a transition from "ON" to "OFF" are inside the polygon, and therefore have a set status of "IN" (open circle in FIG. 11), and corners of pixels not between "ON" and "OFF" are outside the polyline, and therefore have a set status of "OUT."

(3-2) Setting the Luminance Value of Each Pixel of the Bitmap

To set the luminance value of each pixel of the bitmap, the value of each pixel of an 8-bit grayscale bitmap can be set according to the IN/OUT status using the first through third methods described below, for example.

(First Method: Using Binarization)

In the first method, a first luminance value (e.g., 255) is set for pixels in which all four corners are "IN." A second luminance value (e.g., 0) is set for pixels in which all four corners are "OUT." The first luminance value (e.g., 255) is set for all other pixels, i.e., pixels having both "IN" and "OUT" corners among the four corners thereof.

When this method is used, the first luminance value (e.g., 255) is set for pixels that are entirely inside the contour polyline, and the second luminance value (e.g., 0) is set for pixels that are entirely outside the contour polyline. The first luminance value (e.g., 255) is also set for pixels that are partially inside or outside the contour polyline.

Rather than a single value (e.g., 255), a value selected from values having a certain range (e.g., 250 to 255) may also be set as the first luminance value. Similarly, rather than a single value (e.g., 0), a value selected from values having a certain range (e.g., 0 to 5) may be set as the second luminance value. The same applies for the second and third methods described below.

(Second Method: Using Binarization)

The second method differs from the first method in that the second luminance value (e.g., 0) is set for pixels having both "IN" and "OUT" corners among the four corners thereof.

When this method is used, the first luminance value (e.g., 255) is set for pixels that are entirely inside the contour polyline, and the second luminance value (e.g., 0) is set for pixels that are entirely outside the contour polyline, the same as when the first method is used. However, unlike when the first method is used, the second luminance value (e.g., 0) is set for pixels that are partially inside or outside the contour polyline when the second method is used.

When the second method is used (and also when the first method is used), the processing to be executed is simpler than in the third method described below, and processing speed can therefore be enhanced.

(Third Method: Using Anti-Aliasing)

The third method differs from the first and second methods in that a luminance value that is based on the size of the region included inside the contour polyline is set for pixels having both "IN" and "OUT" corners among the four corners thereof, i.e., pixels that are partially inside or outside the contour polyline.

Figure 15:
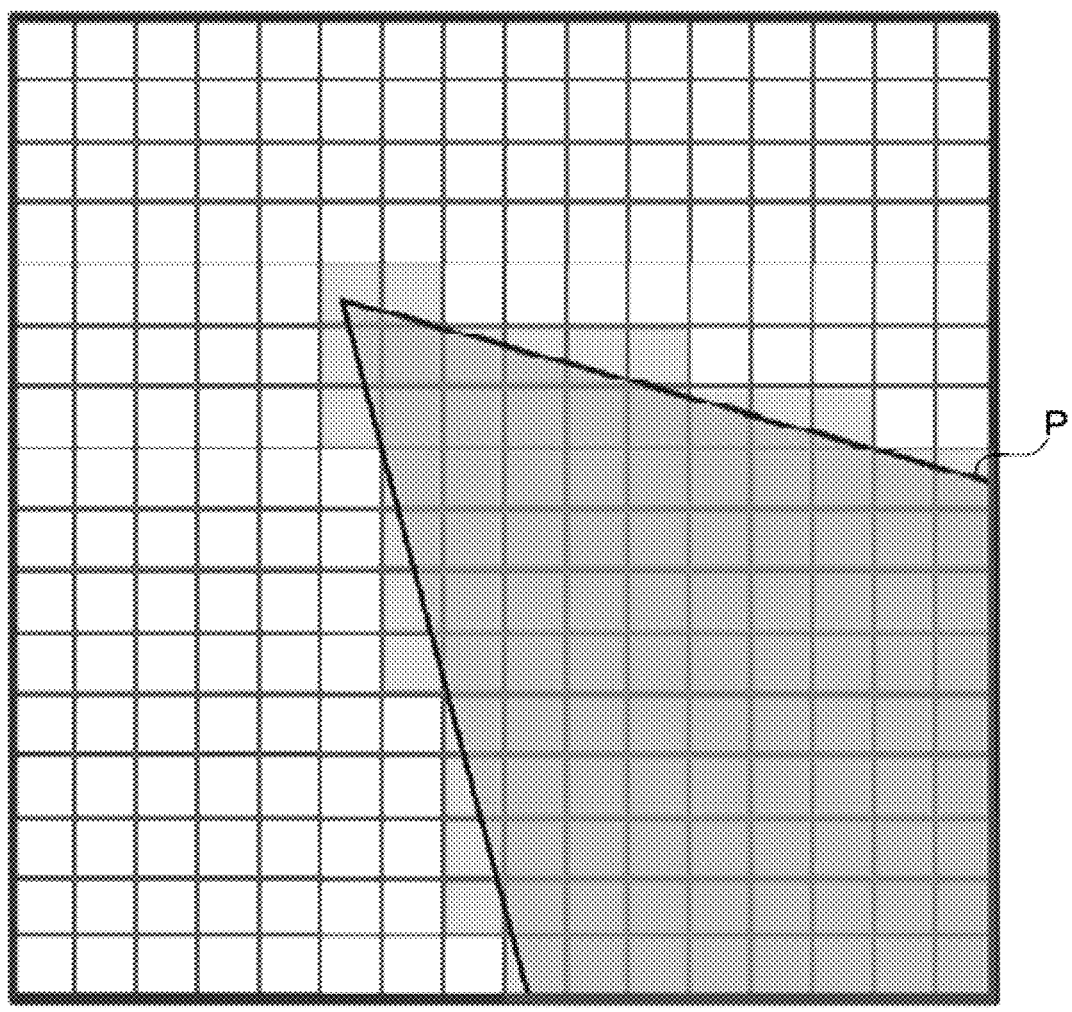
FIG. 15 is a schematic view illustrating an example of the method for assigning a luminance value to pixels that are partially included inside or outside the contour polyline in the slide data creation device according to an embodiment of the disclosed technology.

The processing described below, for example, is performed for such pixels. FIG. 15 is a schematic view illustrating an example of the method for assigning a luminance value to pixels that are partially included inside or outside the contour polyline in the slide data creation device according to an embodiment of the disclosed technology.

(1) The pixel is divided into a subdivided pixel group subdivided into 16×16=256 subdivisions.

(2) Using the 16×16 grid as a single image, inside/outside determination is performed by scan conversion. Specifically, a determination is made by scan conversion as to whether each of the four corners (grid points) of each subdivided pixel (each grid) is inside ("IN") or outside ("OUT") of the contour polyline P.

(3) The total number n of subdivided pixels (within the gray region of FIG. 15) having a grid point determined to be "IN" is calculated. The value of min(n, 255) is used as the luminance value of the pixel.

When this method is used, the first luminance value (e.g., 255) is set for pixels that are entirely inside the contour polyline, and the second luminance value (e.g., 0) is set for pixels that are entirely outside the contour polyline, the same as when the first or second method is used. However, the third method differs from the first and second methods in that a luminance value based on the size of the region of the pixel that is included inside the contour polyline is set for pixels that are partially inside or outside the contour polyline. For example, in FIG. 16A, the luminance values "128," "128," and "224" are set for three pixels 301, 302, 303, respectively, that are partially inside or outside the contour polyline P, rather than the first luminance value and the second luminance value.

When the third method is used, an anti-aliasing image is obtained in which contour portions of a figure are smoothly represented. When the first or second method is used, an image is obtained in which there are jagged artifacts in contour portions of the figure.

Although it is possible to execute the anti-aliasing described above for all pixels that are partially inside or outside the contour polyline, anti-aliasing may instead be executed only for an arbitrary portion of such pixels rather than for all of such pixels.

(3-3) Changing (Resetting) the Luminance Values Set for Pixels of the Bitmap

The intensity of light projected from the light source of the projector of the three-dimensional modeling device is not necessarily uniform across the entire projection plane (liquid surface) in a photocurable material, and generally tends to decrease progressively from the center of the projection plane toward the periphery thereof. Therefore, in order for light to be projected uniformly in the projection plane, the luminance values are preferably set low in advance for pixels that correspond to bright portions of the projection plane.

Therefore, in various embodiments of the disclosed technology, the slice data creation device 10 performs shading correction such as described below on a bitmap image (image in which luminance values are set by the third method described above) that has been subjected to the anti-aliasing described above. It is also possible for the shading correction described herein to be executed for an image in which luminance values are set by any of the first and second methods described above.

Figure 17:
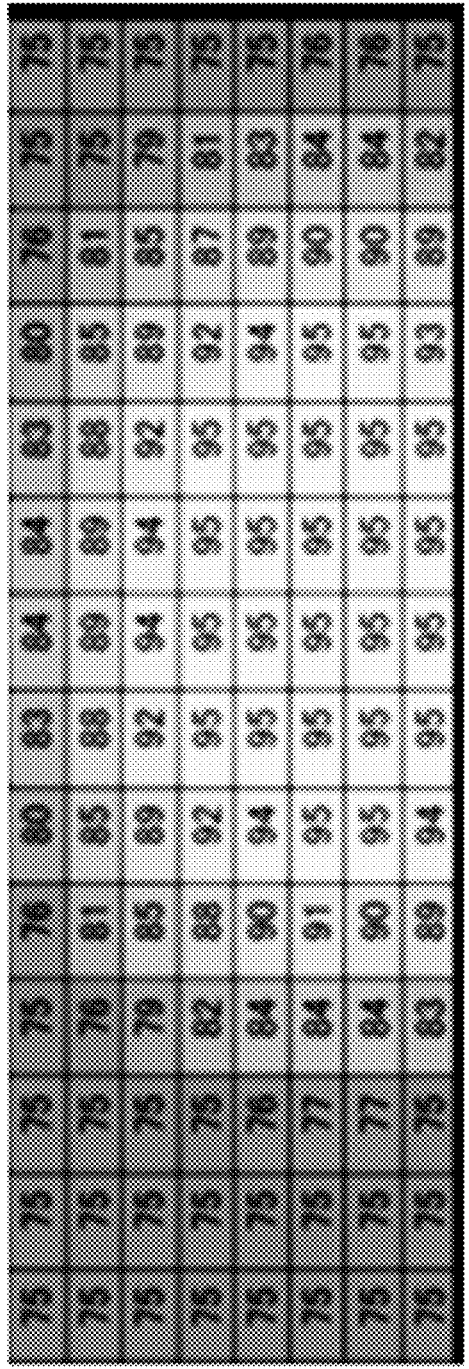
FIG. 17 is a schematic view illustrating an example of the light intensity setting value (light intensity measurement value) table used in the slice data creation device according to an embodiment of the disclosed technology.

The slice data creation device 10 first retains a light intensity measurement value table (in software) such as the one illustrated in FIG. 17, for example. In this light intensity measurement value table, an input image having 1366×768 pixels, for example, is divided into 14×8 block regions, and light intensity measurement values (with units of %) allocated to each block region are stored, as illustrated in FIG. 17. The table indicates that the larger (smaller) the light intensity measurement value allocated to each block region is, the brighter (darker) the block region is.

This light intensity measurement value table can be obtained by e.g., placing a power meter at the output end of the projector and then measuring the light intensity of each block region through use of the power meter when the projector sequentially projects an image of the 14×8 block regions.

In another embodiment, a light intensity setting value table equivalent to the light intensity measurement value table may be used instead of the light intensity measurement value table. The light intensity setting value table is provided by the manufacturer of the projector, and stores light intensity setting values allocated to each block region in an input image inputted to the projector.

Light intensity distribution values (light intensity correction values) that are the inverse of the light intensity measurement values (light intensity setting values) allocated to each block region are multiplied for corresponding pixels in the input image inputted to the projector, and the light intensity distribution at the projection plane in the photocurable material is thereby made uniform.

The slice data creation device 10 thereby computes the light intensity correction value of each block region from the light intensity measurement value (light intensity setting value) allocated to the block region using the following equation.

Light intensity correction value (%)=100%−(Light intensity measurement value−Smallest light intensity measurement value)    (Equation A):

When such a light intensity correction value is used, the light intensity (luminance value) of the pixel included in the block region for which the light intensity measurement value (light intensity setting value) is smallest (darkest) is multiplied by the largest ratio (100%), and thereby does not change, whereas the light intensity (luminance value) of the pixel included in the block region for which the light intensity measurement value (light intensity setting value) is largest (brightest) is multiplied by a ratio inversely proportional to the light intensity measurement value (light intensity setting value) thereof, and is thereby corrected so as to be smaller (darker) in accordance with the light intensity measurement value (light intensity setting value) thereof.

Figures 16A, 16D, 16E:
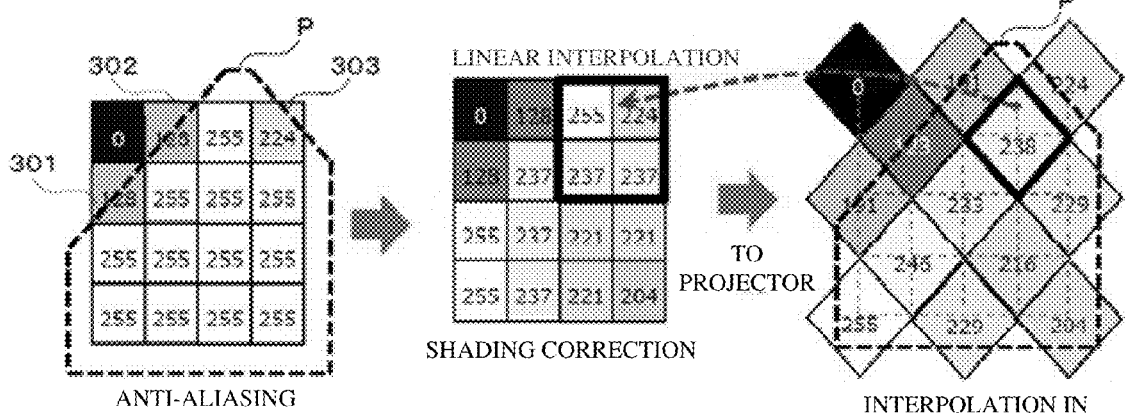
FIGS. 16A, 16B, 16C, 16D, and 16E are schematic views illustrating the processing performed in the slice data creation device and the three-dimensional modeling device according to an embodiment of the disclosed technology.
Figures 16B, 16C:
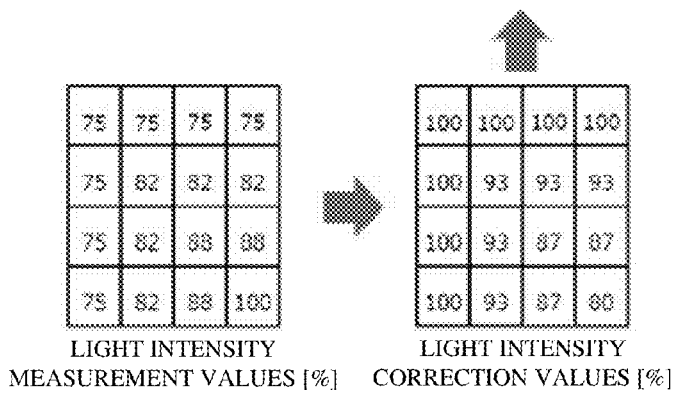

Specifically describing the example illustrated in FIG. 16A, the light intensity measurement values (light intensity setting values) illustrated in FIG. 16B are read from the abovementioned light intensity measurement value (light intensity setting value) table for the 4×4=16 pixels of the anti-aliased bitmap image illustrated in FIG. 16A. The light intensity correction values illustrated in FIG. 16C are computed using the abovementioned equation A from the light intensity measurement values (light intensity setting values). The corresponding correction values from the light intensity correction values illustrated in FIG. 16C are multiplied by the luminance values set for the pixels in the bitmap image illustrated in FIG. 16A, whereby the shading-corrected bitmap data (bitmap image) illustrated in FIG. 16D are obtained. Although it is possible to execute the shading correction described above for all pixels in the bitmap image, shading correction may instead be executed only for arbitrary pixels in the bitmap image.

An example was described in the present embodiment in which the corresponding light intensity correction value was simply multiplied by the luminance value set for each pixel in the bitmap image. However, in another embodiment, rather than using the light intensity correction value without modification thereto, the light intensity correction value may be further multiplied by a coefficient or a function may be applied according to the circumstances of the device being used (e.g., on the basis of an actual measured relationship between the light intensity of the projector and a luminance value of the input image). Specifically, a separate equation using the light intensity correction value may be derived, and a value computed using the separate equation may be multiplied by the luminance value set for each pixel in the bitmap image.

The slice data creation device 10 then outputs the data (bitmap data) generated by the processing in the fill data generation unit 46 to the three-dimensional modeling device 100 as slice data for optical modeling. The slice data creation device 10 may output bitmap data in which luminances are set by any of the first through third methods described above as slice data to the three-dimensional modeling device 100, or may additionally output bitmap data for which the shading correction described above has been applied as slice data to the three-dimensional modeling device 100.

The device disclosed in Japanese Patent No. 4049654, for example, may be used as the three-dimensional modeling device 100. The entire contents of Japanese Patent No. 4049654 are hereby incorporated herein by reference.

Figure 18:
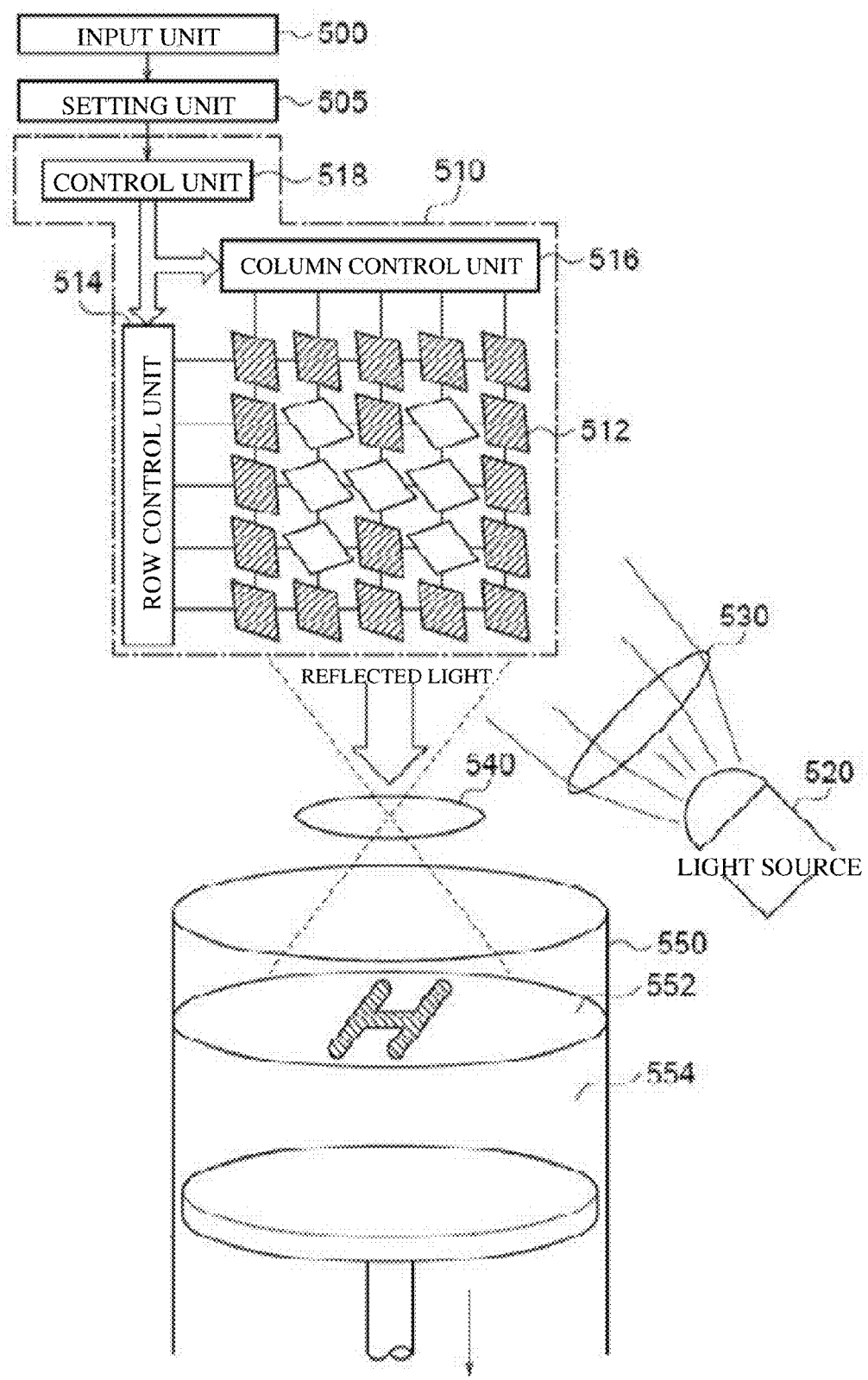
FIG. 18 is a schematic view illustrating an example of the configuration of the three-dimensional modeling device according to an embodiment of the disclosed technology.

FIG. 18 is a schematic view illustrating an example of the configuration of the three-dimensional modeling device 100 according to an embodiment of the disclosed technology. As illustrated in FIG. 18, the three-dimensional modeling device 100 primarily includes an input unit 500 to which slice data from the slice data creation device 10 are inputted, a setting unit 505 for setting a luminance value using the inputted slice data, a digital mirror element 510, a light source 520 for radiating light, a lens 530 for converting the light from the light source 520 to parallel light and radiating the parallel light to the digital mirror element 510, a lens 540 for converging the light reflected by the digital mirror element 510, and a container 550 for accommodating a photocurable material 554.

The setting unit 505 sets a luminance value for each pixel constituting a digital image handled by the three-dimensional modeling device 100 (projector), using the inputted slice data.

The pixels constituting the bitmap image created by the slice data creation device 10 and the pixels constituting the digital image handled by the three-dimensional modeling device 100 (projector) have mutually different shapes and do not have a 1-to-1 correspondence, as is apparent by comparing FIG. 16D and FIG. 16E. Specifically, the pixels constituting the slice data are substantially square shaped, whereas the pixels constituting the digital image handled by the three-dimensional modeling device 100 (projector) are substantially diamond shaped. The image pixels therefore do not correspond 1-to-1.

The setting unit 505 therefore sets a luminance value for each of the pixels constituting the digital image handled by the three-dimensional modeling device 100 (projector), using the slice data (bitmap image) inputted from the slice data creation device 10. Specifically, the pixels constituting the slice data (bitmap image) inputted from the slice data creation device 10 being "first pixels," and the pixels constituting the digital image handled by the three-dimensional modeling device 100 (projector) being "second pixels," the setting unit 505 sets a luminance value for each second pixel by interpolation using luminance values set for two or more corresponding first pixels from among a plurality of first pixels. For example, referring to FIGS. 16D and 16E, the luminance value for one substantially diamond-shaped pixel indicated by a thick-bordered box in FIG. 16E is set to "238" by interpolation by a bilinear method using luminance values (255, 237, 224, 237) set for four substantially square-shaped pixels also indicated by a thick-bordered box in FIG. 16D. FIG. 16 illustrates an example in which the setting unit 505 sets a luminance value for each second pixel by interpolation using the luminance values set for "four" corresponding first pixels from among the plurality of first pixels, but a configuration may be adopted in which the setting unit 505 sets a luminance value for each second pixel by interpolation using the luminance values set for "an arbitrary number (plurality) of" corresponding first pixels from among the plurality of first pixels.

The method used for interpolation is not limited to a bilinear method, and any other method, including nearest-neighbor methods or bicubic methods, may also be used.

The digital mirror element 510 includes a plurality of movable mirror groups (plurality of reflecting means) 512 arranged in a matrix, a row control unit 514 for controlling the movable mirror groups 512 in a row direction, a column control unit 516 for controlling the movable mirror groups 512 in a column direction, and a control unit 518 for controlling the row control unit 514 and the column control unit 516.

Each of the movable mirror groups 512 is disposed so as to correspond to second pixels, and is supported so as to be able to rotate between a first position (ON position) in which light emitted by the light source 520 is reflected and directed to a liquid surface 552 of the photocurable material 554, and a second position (OFF position) in which light emitted by the light source 520 is not directed to the liquid surface 552 of the photocurable material 554.

The control unit 518 controls the rotation (mirror angle) of the movable mirrors of the movable mirror groups 512 via the row control unit 514 and the column control unit 516 on the basis of the luminance values set by the setting unit 505 for the second pixels that correspond to the movable mirrors. Specifically, the control unit 518 controls the row control unit 514 and the column control unit 516 so that movable mirror groups 512 corresponding to second pixels in which a larger (smaller) luminance value is set are positioned at the first (second) position for a longer (shorter) time. Positions on the liquid surface 552 that correspond to second pixels thereby receive light irradiation for a longer (shorter) time, and the amount of curing thereof is increased (decreased).

Through this embodiment of the disclosed technology, luminance values are set for the second pixels by interpolation using the luminance values set for two or more corresponding first pixels from among the plurality of first pixels even when the first pixels constituting the slice data generated by the slice data generator and the second pixels constituting the digital image used in the three-dimensional modeling device do not correspond 1-to-1 due to having different shapes or other characteristics. The three-dimensional modeling device can thereby appropriately fabricate a three-dimensional modeled object on the basis of slice data inputted from the slice data generator. Even when the abovementioned anti-aliasing for the bitmap image is not performed, by executing processing whereby luminance values are set for the second pixels by interpolation using the luminance values set for two or more corresponding first pixels from among the plurality of first pixels, the luminance values of corresponding "second pixels" near an edge of the contour polyline are essentially corrected using the luminance values of "first pixels" positioned outside the contour polyline. The effect is thereby obtained that the contour portions of the final three-dimensional modeled object are smoothly formed. When the abovementioned anti-aliasing for the bitmap image is performed, the effect of the anti-aliasing combines with the above effect to produce an effect whereby the contour portions of the final three-dimensional modeled object are more smoothly formed.

Figure 12:
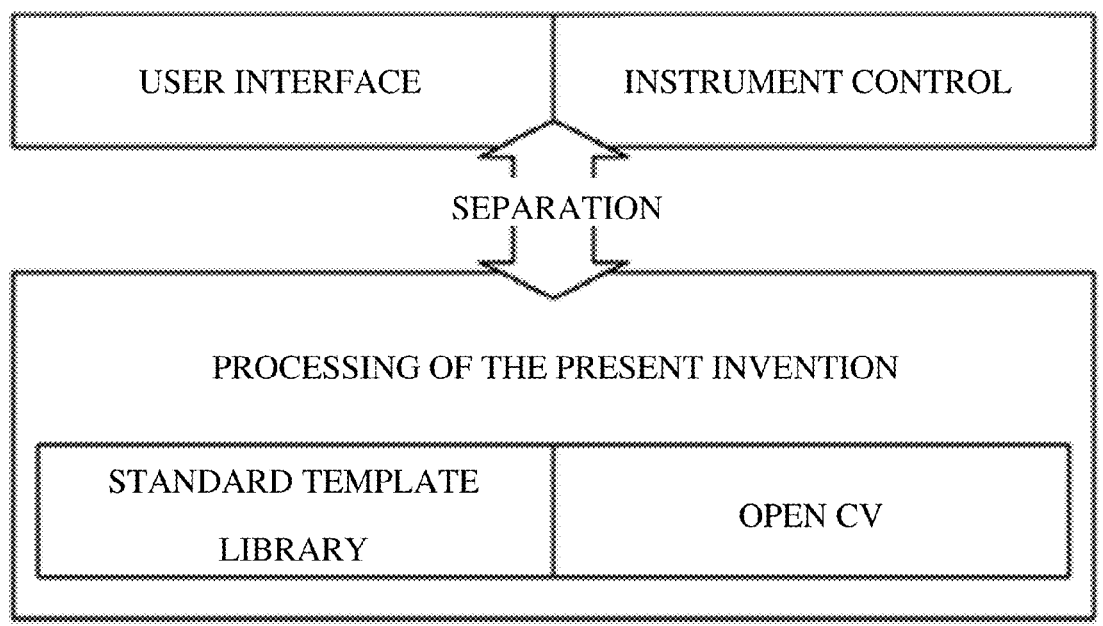
FIG. 12 is a view illustrating an application software structure.

In implementing a program for the sequence of processing for generating slice data for three-dimensional modeling according to the example of the present embodiment described above, the common Standard Template Library (STL) and OpenCV libraries may be used exclusively in order to obtain a platform-independent configuration, and a platform-specific implementation may be used for only the user interface and control of the three-dimensional modeling device (see FIG. 12). Implementation in various platforms can thereby be facilitated.

Specifically, the procedures according to various embodiments of the disclosed technology can be programmed in software for calculating and acquiring slice data for three-dimensional modeling from a polygon mesh of a solid model.

Although not described in detail above, a configuration may be adopted in which the contour shape obtained when a three-dimensional modeled object is sliced at a constant pitch from the top end to the bottom end thereof is displayed on the display device 18 in order to facilitate the work of a worker and provide a sense of reassurance to the worker.

The displayed result may also be only an outline automatically modified so that the inside thereof can be filled normally.

As described above, in the method according to the various embodiments of the disclosed technology, slice data can be generated without high-speed modification of a polygon mesh that does not satisfy conditions of a perfect solid model.

Consequently, in the method according to the various embodiments of the disclosed technology, there is no need to prepare special software for modifying a polygon mesh, and workers do not need advanced skill in software operation.

In the method according to the various embodiments of the disclosed technology, modified contour shapes modified by processing according to the various embodiments of the disclosed technology are displayed prior to three-dimensional modeling. A worker can thereby understand whether three-dimensional modeling is possible, and the worker can be reassured.

The method according to the various embodiments of the disclosed technology described above are applicable not only to optical modeling but also to various products for raster drawing, and can easily be transplanted to various platforms.

The various embodiments of the disclosed technology can be used in the creation of slice data used in various kinds of devices such as a three-dimensional modeling device for fabricating a three-dimensional modeled object using a photocurable resin cured by light irradiation.

REFERENCE NUMBERS

10 . . . slice data creation device
12 . . . central processing device (CPU)
14 . . . bus
16 . . . storage device
18 . . . display device
20 . . . pointing device
22 . . . character input device
24 . . . input/output interface circuit (I/O)
26 . . . external storage device
28 . . . storage medium
30 . . . read/write device
42 . . . polygon mesh creation unit
44 . . . contour extraction unit
46 . . . fill data creation unit
100 . . . three-dimensional modeling device

What is claimed is:

1. A slice data generator for generating slice data representing a cross section cut from a three-dimensional modeled object comprising:
a changing unit for changing topology information of a polygon mesh so that a contour polyline is obtained indicating a contour line of a cut cross unit of the polygon mesh;
a modifying unit for acquiring the contour polyline from the polygon mesh, the topology information of the polygon mesh having been changed by said changing unit, and modifying said contour polyline so that an inside which is a region inside said acquired contour polyline can be normally filled; and
a setting unit for setting a luminance value for each of a plurality of first pixels constituting the slice data on the basis of a positional relationship between said contour polyline modified by said modifying unit and each first pixel,
wherein said setting unit sets a first luminance value for each first pixel that is entirely inside said contour polyline, and sets a second luminance value smaller than said first luminance value for each first pixel that is entirely outside said contour polyline.

2. The slice data generator of claim 1, wherein said setting unit sets said first luminance value or said second luminance value for each first pixel that is partially inside or outside said contour polyline.

3. The slice data generator of claim 1, wherein said setting unit sets, for each first pixel that is partially inside or outside said contour polyline, a luminance value based on the size of the region of the first pixel that is included inside said contour polyline.

4. The slice data generator of claim 1, wherein said setting unit corrects at least a portion of luminance values set for the first pixels using correction values set on the basis of a characteristic of a light source used in a three-dimensional modeling device for fabricating a three-dimensional modeled object on the basis of said slice data.

5. A three-dimensional modeling device comprising:
an input unit for inputting slice data generated by the slice data generator of claim 1;
a plurality of reflectors, each of which is provided to correspond to a corresponding one of a plurality of second pixels and supported so as to be able to rotate between a first position in which light emitted by said light source is reflected and directed to a photocurable material, and a second position in which light emitted by said light source is not directed to said photocurable material;
a setting unit for setting a luminance value for each second pixel by interpolation using luminance values set for two or more corresponding first pixels from among said plurality of first pixels; and
a control unit for controlling the rotation of each reflector of said plurality of reflectors on the basis of the luminance value set for the second pixel corresponding to the reflector.

6. The three-dimensional modeling device of claim 5, wherein
each of said plurality of first pixels is square shaped, and each of said plurality of second pixels is diamond shaped; and
said setting unit sets a luminance value for each second pixel by interpolation using luminance values set for any number of first pixels overlapping the second pixels from among said plurality of first pixels.

7. A slice data generation method for generating slice data representing a cross section cut from a three-dimensional modeled object comprising:
changing topology information of a polygon mesh so that a contour polyline is obtained indicating a contour line of a cut cross section of the polygon mesh;
acquiring the contour polyline from the polygon mesh, the topology information of the polygon mesh having been changed in the step for changing, and modifying said contour polyline so that an inside which is a region inside said acquired contour polyline can be normally filled; and
setting a luminance value for each of a plurality of first pixels on the basis of a positional relationship between said contour polyline that has been modified and each first pixel, and sets a first luminance value for each first pixel that is entirely inside said contour polyline, and sets a second luminance value smaller than said first luminance value for each first pixel that is entirely outside said contour polyline.

8. A non-transitory computer-readable medium encoded with a computer program for causing a computer to implement a slice data generation method, comprising:
changing topology information of a polygon mesh so that a contour polyline is obtained indicating a contour line of a cut cross section of the polygon mesh;
acquiring the contour polyline from the polygon mesh, the topology information of the polygon mesh having been changed in the step for changing, and modifying said contour polyline so that an inside which is a region inside said acquired contour polyline can be normally filled; and
setting a luminance value for each of a plurality of first pixels on the basis of a positional relationship between said contour polyline that has been modified and each first pixel,
wherein the setting comprises setting a first luminance value for each first pixel that is entirely inside said contour polyline, and setting a second luminance value smaller than said first luminance value for each first pixel that is entirely outside said contour polyline.

9. The non-transitory computer-readable medium of claim 8, wherein said setting comprises setting said first luminance value or said second luminance value for each first pixel that is partially inside or outside said contour polyline.

10. The non-transitory computer-readable medium of claim 8, wherein said setting comprises setting, for each first pixel that is partially inside or outside said contour polyline, a luminance value based on the size of the region of the first pixel that is included inside said contour polyline.

11. The non-transitory computer-readable medium of claim 8, wherein said setting comprises correcting at least a portion of luminance values set for the first pixels using correction values set on the basis of a characteristic of a light source used in a three-dimensional modeling device for fabricating a three-dimensional modeled object on the basis of said slice data.

12. A system comprising:
a memory or storage device; and
a processor programmed or configured to:
change topology information of a polygon mesh so that a contour polyline is obtained indicating a contour line of a cut cross unit of the polygon mesh;
acquire the contour polyline from the polygon mesh, the topology information of the polygon mesh having been changed;

modify said contour polyline so that a region inside said acquired contour polyline can be normally filled; and set a luminance value for each of a plurality of first pixels constituting the slice data on the basis of a positional relationship between said contour polyline modified by said modifying and each first pixel, wherein a first luminance value is set for each first pixel that is entirely inside said contour polyline, and a second luminance value smaller than said first luminance value is set for each first pixel that is entirely outside said contour polyline.

13. The system of claim 12, wherein said first luminance value or said second luminance value is set for each first pixel that is partially inside or outside said contour polyline.

14. The system of claim 12, wherein, for each first pixel that is partially inside or outside said contour polyline, a luminance value is set based on the size of the region of the first pixel that is included inside said contour polyline.

15. The system of claim 12, wherein said processor is further programmed or configured to correct at least a portion of luminance values set for the first pixels using correction values set on the basis of a characteristic of a light source used in a three-dimensional modeling device for fabricating a three-dimensional modeled object on the basis of said slice data.

16. A three-dimensional modeling device comprising:

an input unit for inputting slice data generated by the system of claim 12;

a plurality of reflectors, each of which is provided to correspond to a corresponding one of a plurality of second pixels and supported so as to be able to rotate between a first position in which light emitted by said light source is reflected and directed to a photocurable material, and a second position in which light emitted by said light source is not directed to said photocurable material;

a setting unit for setting a luminance value for each second pixel by interpolation using luminance values set for two or more corresponding first pixels from among said plurality of first pixels; and a control unit for controlling the rotation of each reflector of said plurality of reflectors on the basis of the luminance value set for the second pixel corresponding to the reflector.

17. The three-dimensional modeling device of claim 16, wherein each of said plurality of first pixels is square shaped, and each of said plurality of second pixels is diamond shaped; and said setting unit sets a luminance value for each second pixel by interpolation using luminance values set for any number of first pixels overlapping the second pixels from among said plurality of first pixels.

* * * * *